(12) United States Patent
Yang et al.

(10) Patent No.: US 12,732,689 B2
(45) Date of Patent: Sep. 8, 2026

(54) IMAGE CAPTURE METHOD AND ELECTRONIC DEVICE

(71) Applicant: Honor Device Co., Ltd., Shenzhen (CN)

(72) Inventors: Zhi Yang, Shenzhen (CN); Yuanchao Du, Shenzhen (CN); Shiyu Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 94 days.

(21) Appl. No.: 18/865,164

(22) PCT Filed: Nov. 22, 2023

(86) PCT No.: PCT/CN2023/133484
§ 371 (c)(1),
(2) Date: Nov. 12, 2024

(87) PCT Pub. No.: WO2024/174624
PCT Pub. Date: Aug. 29, 2024

(65) Prior Publication Data

US 2025/0317644 A1 Oct. 9, 2025

(30) Foreign Application Priority Data

Feb. 22, 2023 (CN) ......................... 202310190142.8

(51) Int. Cl.
*H04N 23/63* (2023.01)
*G06V 40/16* (2022.01)
(Continued)

(52) U.S. Cl.
CPC ......... *H04N 23/632* (2023.01); *G06V 40/165* (2022.01); *G06V 40/167* (2022.01); *H04N 23/611* (2023.01); *H04N 23/64* (2023.01)

(58) Field of Classification Search
None
See application file for complete search history.

(56) References Cited

U.S. PATENT DOCUMENTS 8,587,440 B2 * 11/2013 Weng ..................... G08B 21/06
340/575
12,003,850 B2 6/2024 Lv et al.
(Continued)

FOREIGN PATENT DOCUMENTS

CN 109389018 A 2/2019
CN 109710080 A 5/2019
(Continued)

*Primary Examiner* — Quan Pham
(74) *Attorney, Agent, or Firm* — Conley Rose, P.C.

(57) ABSTRACT

An image capture method and an electronic device are provided and relate to the field of images technologies. A preview image is captured via a camera, and a human face yaw angle of each frame of preview image is obtained. The human face yaw angle is a left/right rotation angle of an orientation of the face of a first user relative to a first connection line. The first user is a user photographed by the camera, and the first connection line is a line connecting the camera and the head of the first user. If human face yaw angles from an $i^{th}$ frame of preview image to a $k^{th}$ frame of preview image meet a preset condition, a $j^{th}$ frame of preview image is stored. The $k^{th}$ frame of preview image is a preview image currently captured by the camera. 1≤i≤j≤k, and i, j, and k are all integers.

20 Claims, 29 Drawing Sheets

(51) Int. Cl.
*H04N 23/60* (2023.01)
*H04N 23/611* (2023.01)

(56) References Cited

U.S. PATENT DOCUMENTS

| | | | |
|---|---|---|---|
| 2022/0294937 | A1 | 9/2022 | Furukawa et al. |
| 2024/0276055 | A1 | 8/2024 | Huo et al. |

FOREIGN PATENT DOCUMENTS

| | | | | | |
|---|---|---|---|---|---|
| CN | 110365905 | A | | 10/2019 | |
| CN | 111414789 | A | | 7/2020 | |
| CN | 111652139 | A | | 9/2020 | |
| CN | 111814613 | A | * | 10/2020 | ........... G06V 40/172 |
| CN | 112425156 | A | | 2/2021 | |
| CN | 113051978 | A | | 6/2021 | |
| CN | 113177917 | A | | 7/2021 | |
| CN | 113676660 | A | | 11/2021 | |
| CN | 110363170 | B | * | 2/2022 | ............. G06V 20/46 |
| CN | 114627526 | A | | 6/2022 | |
| CN | 115002340 | A | | 9/2022 | |
| JP | 2009279186 | A | * | 12/2009 | |
| JP | 2013132025 | A | | 7/2013 | |
| WO | 2019213819 | A1 | | 11/2019 | |
| WO | 2020151580 | A1 | | 7/2020 | |

* cited by examiner

CONT. FROM FIG. 7B

CONT. FROM FIG. 7C

FIG. 13A
1301
Generate a captured image
TO FIG. 13B
Video
Photo
Pro
More

FIG. 13B
1303
1302
CONT.
FROM
FIG. 13A
Video
Photo
Pro
More
Tap 1302
TO
FIG. 13C

CONT. FROM FIG. 13B

IMAGE CAPTURE METHOD AND ELECTRONIC DEVICE

CROSS-REFERENCE TO RELATED APPLICATIONS

This is a U.S. national stage of International Application No. PCT/CN2023/133484, filed on Nov. 22, 2023, which claims priority to Chinese Patent Application No. 202310190142.8, filed with the China National Intellectual Property Administration on Feb. 22, 2023, both of which are incorporated herein by reference in their entireties.

TECHNICAL FIELD

This application relates to the field of images technologies, and in particular, to an image capture method and an electronic device.

BACKGROUND

Currently, camera applications are usually provided in electronic devices such as mobile phones and tablets. The electronic device may use the camera application to shoot images or record videos. If a user wants to capture a highlight moment via the camera application, for example, the user wants to capture an end moment of looking back, it can be usually implemented only through manually controlling of a shooting timing.

However, the inventor found in a process of implementing embodiments of this application that the manually controlling of the shooting timing is usually difficult to accurately capture the highlight moment, and an error rate is extremely high.

SUMMARY

Embodiments of this application provide an image capture method and an electronic device, to accurately capture a highlight frame of looking back.

According to a first aspect, an embodiment of this application provides an image capture method, applied to electronic devices, such as mobile phones and tablets, that include cameras. The electronic device may capture a preview image via the camera, and obtain a human face yaw angle of each frame of preview image. The human face yaw angle is a left/right rotation angle of an orientation of the face of a first user relative to a first connection line. The first user is a user photographed by the camera, and the first connection line is a line connecting the camera and the head of the first user.

Up to a currently captured $k^{th}$ frame of preview image, if there is a decreasing motion in human face yaw angle from a large value to a small value, it may be determined that looking back occurs. In this case, the electronic device may store a preview image in which the human face yaw angle decreases to a small value as a highlight frame of looking back. Specifically, if human face yaw angles from an $i^{th}$ frame of preview image to the $k^{th}$ frame of preview image meet a preset condition, a $j^{th}$ frame of preview image is stored as a highlight frame of looking back. The $k^{th}$ frame of preview image is a preview image currently captured by the camera. $1 \leq i \leq j \leq k$, and i, j, and k are all integers. The preset condition includes: The human face yaw angle of the $i^{th}$ frame of image is greater than a first angle threshold, human face yaw angles from the $i^{th}$ frame of image to the $j^{th}$ frame of preview image show a decreasing change trend, and the human face yaw angle of the $j^{th}$ frame of preview image is less than a second angle threshold.

To sum up, according to embodiments of this application, the electronic device may determine a moment at which the human face yaw angle decreases to a small value from a large value as an end moment of looking back, and store a preview image corresponding to the moment, that is, the highlight frame of looking back. In this way, the electronic device can accurately capture the highlight frame of looking back during a preview process.

To be precise, the end moment of looking back should be a moment at which a human face yaw angle reaches a smallest value through a change from a large value to a small value. Based on this, in one possible design of the first aspect, the $k^{th}$ frame of image is a preview image after the $j^{th}$ frame of preview image, that is, $j<k$. In addition, in this design, the moment at which the human face yaw angle reaches the smallest value through the change from the large value to the small value is determined as the end moment of looking back. Specifically, in this implementation, the preset condition further includes: The human face yaw angle of the $j^{th}$ frame of preview image is a smallest value in human face yaw angles from the $j^{th}$ frame of preview image to the $k^{th}$ frame of preview image.

For example, the second angle threshold is 30°, and human face angles change in 70°, 65°, 62°, . . . , 31°, 28°, 25°, 23°, 24°, 24°, and 26°. Although a condition of being less than the second angle threshold is already met when the human face angle is 28°, the human face angles continue to decrease after 28°, for example, decrease to 25° and 23° in sequence. In this case, the looking back is not yet over. It is not difficult to notice that the human face angles gradually increase after decreasing to 23°, for example, increase to 24°, 24°, and 26° in sequence. In other words, the human face angles gradually increase after decreasing to a smallest value of 23°. In this design, in this example, a preview image corresponding to 23° may be stored as the highlight frame of looking back.

In this design, a moment for decreasing to the smallest value is determined as an end moment of looking back, and a preview image corresponding to the moment is stored. In this way, the true end moment of looking back can be determined, improving accuracy of the capture.

At the end moment of looking back, the human face usually pauses for a period of time. During this period of time, human face angles only have a minimal change, such as a change within 3°. Based on this, in another possible design of the first aspect, after the decrease to the smallest value is determined, an amplitude of a change in human face yaw angles after the smallest value is further detected, and only when the amplitude of the change is small, a moment for reaching the smallest value is determined as the end moment of looking back, and a preview image at the moment is stored as the highlight frame of looking back. Specifically, in this implementation, the preset condition further includes: Absolute differences between the human face yaw angle of the $j^{th}$ frame of preview image and human face yaw angles of m frames of preview images that are after the $j^{th}$ frame of preview image are all less than a first difference threshold, where $1 \leq m$, $j+m \leq k$, and m is an integer.

In this design, the moment for the smallest value is determined as the end moment of looking back only when it is determined that there is a small amplitude of change after the human face yaw angles decrease to the smallest value. This improves accuracy of the capture.

Experience shows that a side face with a large angle is likely to encounter a deviation during detecting a human face yaw angle of the side face. For example, 90° is detected as 25°, 30°, or the like. In this scenario, the detected human face angle may have a jump, such as a large increase or decrease. However, in reality, the change in human face yaw angle is a stable process and usually does not experience a jump. Based on this, in another possible design of the first aspect, after the decrease to the smallest value is determined, differences between the smallest value and adjacent human face yaw angles before and after the smallest value are further detected, and only when absolute values of the differences (namely, absolute differences) are small, a moment for reaching the smallest value is determined as the end moment of looking back, and a preview image at the moment is stored as the highlight frame of looking back. Specifically, in this design, the preset condition further includes: An absolute difference between the human face yaw angle of the $j^{th}$ frame of preview image and a human face yaw angle of the first user in a $(j-1)^{th}$ frame of preview image and an absolute difference between the human face yaw angle of the $j^{th}$ frame of preview image and a human face yaw angle of the first user in a $(j+1)^{th}$ frame of preview image are both less than a second difference threshold.

In this design, a moment at which the human face angles reach the smallest value is determined as the moment of looking back only when the smallest value to which the human face angles decrease is not a value obtained through a jump. This improves accuracy of the determined highlight frame.

In another possible design of the first aspect, the electronic device may store the human face yaw angles in a preset storage space. The preset storage space stores only a fixed quantity (such as n) of human face yaw angles. For example, the preset storage space is a cache, and when the human face yaw angles stored in the cache to a fixed quantity, entering of one human face yaw angle indicates exiting of one human face yaw angle.

Specifically, in this design, after the human face yaw angle of the $k^{th}$ frame of preview image (which is a currently captured preview image) is obtained, the method further includes: If a quantity of human face yaw angles in the preset storage space is less than n, the human face yaw angle of the $k^{th}$ frame of preview image in the preset storage space is stored, where 1≤n, and n is an integer. If a quantity of human face yaw angles in the preset storage space is greater than or equal to n, a human face yaw angle of a $(k-n)^{th}$ frame of preview image is removed from the preset storage space, and the human face yaw angle of the $k^{th}$ frame of preview image in the preset storage space is stored.

In this design, latest n human face yaw angles stored in the preset storage space may be detected each time.

In another possible design of the first aspect, after the human face yaw angle of the $k^{th}$ frame of preview image is stored in the preset storage space, the method further includes: If the quantity of human face yaw angles in the preset storage space is greater than or equal to n, and a first tag does not exist in the electronic device, whether a human face yaw angle of a $(k-n+1)^{th}$ frame of preview image in the preset storage space is greater than the first angle threshold is determined, and a change trend of human face yaw angles from the $(k-n+1)^{th}$ frame of preview image to the $k^{th}$ frame of preview image in the preset storage space is detected. To be specific, the first tag may indicate that it is already detected that the human face yaw angles start to gradually decrease from a large value.

In other words, if it is not yet detected that the human face yaw angles before the $k^{th}$ frame of preview image start to gradually decrease from a large value, after the human face yaw angle of the $k^{th}$ frame of preview image is stored this time, whether human face yaw angles from the $(k-n+1)^{th}$ frame of preview image to the $k^{th}$ frame of preview image that are currently stored in the preset storage space start to gradually decrease from a large value is first detected.

If the human face yaw angle of the $(k-n+1)^{th}$ frame of preview image is greater than the first angle threshold, and the human face yaw angles from the $(k-n+1)^{th}$ frame of preview image to the $k^{th}$ frame of preview image show in a decreasing change trend, the first tag is recorded. In this case, after a human face yaw angle of a new preview image is obtained subsequently, it indicates that human face yaw angles already start to gradually decrease from a large value.

In this design, detecting that the human face yaw angles start to gradually decrease from a large value indicates detecting a start of looking back.

In another possible design of the first aspect, after the human face yaw angle of the $k^{th}$ frame of preview image is stored in the preset storage space, the method further includes: If the quantity of human face yaw angles in the preset storage space is greater than or equal to n, and a first tag exists in the electronic device, it is determined that the human face yaw angle of the first user in the $i^{th}$ frame of image is greater than the first angle threshold, and that the human face yaw angles of the first user from the $i^{th}$ frame of image to the $j^{th}$ frame of preview image show in a decreasing change trend.

In this design, when the first tag already exists, it may be determined that looking back already starts.

In another possible design of the first aspect, the human face yaw angle of the $j^{th}$ frame of image is the human face yaw angle of the $(k-n+1)^{th}$ frame of preview image in the preset storage space. Correspondingly, the $j^{th}$ frame of preview image in the preset condition in which the human face yaw angle of the $j^{th}$ frame of preview image is less than the second angle threshold, the $j^{th}$ frame of preview image in the preset condition in which the human face yaw angle of the $j^{th}$ frame of preview image is the smallest value in the human face yaw angles from the $j^{th}$ frame of preview image to the $k^{th}$ frame of preview image, and the $j^{th}$ frame of preview image in the preset condition in which the absolute differences between the human face yaw angle of the $j^{th}$ frame of preview image and the human face yaw angles of the m frames of preview images before and after the $j^{th}$ frame of preview image are all less than the first difference threshold all refer to the $(k-n+1)^{th}$ frame of preview image. In this way, the $j^{th}$ frame of preview image can be accurately locked and preset detection may be performed.

In another possible design of the first aspect, the method further includes: If an absolute difference between the human face yaw angle of the $(k-n+1)^{th}$ frame of preview image in the preset storage space and a human face yaw angle of a first preview image in the preset storage space is greater than the first difference threshold, the first tag is deleted. The first preview image is any preview image from a $(k-n+2)^{th}$ frame of preview image to a $(k-n+m+1)^{th}$ frame of preview image.

In other words, if the human face yaw angle of the $j^{th}$ frame of preview image and the human face yaw angles of the m frames of preview images after the $j^{th}$ frame of preview image change by a large amplitude, the first tag is deleted. After the first tag is deleted, in a next round of detection, whether looking back starts is detected again.

In another possible design of the first aspect, the method further includes: If an absolute difference between the human face yaw angle of the $(k-n+1)^{th}$ frame of preview image in the preset storage space and a human face yaw angle of a second preview image is greater than the second difference threshold, the first tag is deleted. The second preview image is the $(k-n)^{th}$ frame of preview image or the $(k-n+2)^{th}$ frame of preview image.

In other words, if differences between the human face yaw angle of the $j^{th}$ frame of preview image and human face yaw angles in adjacent preview images before and after the $j^{th}$ frame of preview image are large, the first tag is also deleted. After the first tag is deleted, in a next round of detection, whether looking back starts is detected again.

In another possible design of the first aspect, if the $k^{th}$ frame of preview image does not include the face of the first user, the human face yaw angle in the preset storage space is deleted. In the subsequent process, the electronic device cannot use the deleted human face yaw angle to determine a highlight frame of looking back. This can avoid using discontinuous human face yaw angles of a human face together to determine a highlight frame of looking back, and improves accuracy of determining the highlight frame of looking back.

In another possible design of the first aspect, before the $j^{th}$ frame of preview image is stored, the method further includes: The $j^{th}$ frame of preview image or a thumbnail of the $j^{th}$ frame of preview image is displayed. A first operation of confirming by a user to store the $j^{th}$ frame of preview image is received. Correspondingly, that the $j^{th}$ frame of preview image is stored includes: The $j^{th}$ frame of preview image is stored in response to the first operation. This can avoid storing an image that the user is not satisfied with.

In another possible design of the first aspect, there are a plurality of first users, and the human face yaw angle includes human face yaw angles of all the first users. In this way, a highlight frame of looking back can be detected for each user, for example, separate detection can be performed by storing human face yaw angles of different first users in different preset storage spaces.

According to a second aspect, an embodiment of this application further provides an electronic device. The electronic device may include a display, a memory, and one or more processors. The display and the memory are coupled to the processor. The memory is configured to store computer program code, and the computer program code includes computer instructions. When the computer instructions are executed by the processor, the electronic device is enabled to perform the method according to the first aspect and any one of the possible designs of the first aspect.

According to a third aspect, an embodiment of this application provides a chip system. The chip system is used in an electronic device including a display and a memory. The chip system includes one or more interface circuits and one or more processors, the interface circuit is interconnected to the processor through a line. The interface circuit is configured to receive a signal from the memory of the electronic device and send the signal to the processor. The signal includes computer instructions stored in the memory. When the processor executes the computer instructions, the electronic device is enabled to perform the method according to the first aspect and any one of the possible designs of the first aspect.

According to a fourth aspect, this application provides a computer storage medium. The computer storage medium includes computer instructions. When the computer instructions are run on an electronic device, the electronic device is enabled to perform the method according to the first aspect and any one of the possible designs of the first aspect.

According to a fifth aspect, this application provides a computer program product. When the computer program product runs on a computer, the computer is enabled to perform the method according to the first aspect and any one of the possible designs of the first aspect.

It should be understood that for beneficial effects that can be achieved by the electronic device provided in the second aspect, the chip system in the third aspect, the computer storage medium in the fourth aspect, and the computer program product in the fifth aspect, refer to the beneficial effects in the first aspect and any one of the possible designs of the first aspect. Details are not described herein again.

DESCRIPTION OF EMBODIMENTS

Figure 1A:
FIG. 1A and FIG. 1B are a diagram of an interface of a mobile phone according to an embodiment of this application.

The following describes the technical solutions of embodiments of this application with reference to the accompanying drawings in embodiments of this application. In descriptions of embodiments of this application, terms used in the following embodiments are merely intended to describe particular embodiments, but are not intended to limit this application. As used in the specification and the appended claims of this application, the singular expressions “a/an”, “said”, “the foregoing”, “the” and “this” are intended to include such expressions as “one or more”, unless otherwise clearly indicated in the context. It should be further understood that in the following embodiments of this application, “at least one” and “one or more” refer to one, two, or more. The term “and/or” is used for describing an association relationship between associated objects, and indicates that three relationships may be present. For example, A and/or B may indicate the presence of the following three conditions: only A, both A and B, and only B, where A and B may be singular or plural. A character “/” generally indicates an “or” relationship between associated objects before and after the character.

Reference like “one embodiment” or “some embodiments” described in this specification means that a particular characteristic, structure, or feature described with reference to one or more embodiments is included in the one or more embodiments of this application. Therefore, statements “in one embodiment”, “in some embodiments”, “in some other embodiments”, “in other embodiments”, and the like appear in different places in this specification do not necessarily refer to the same embodiment, but mean “one or more but not all embodiments”, unless otherwise specified in other ways. Terms “include”, “comprise”, “have”, and variations thereof all mean “including but not limited to”, unless otherwise specified. The term “connection” includes a direct connection and an indirect connection, unless otherwise specified. The terms “first” and “second” are used for descriptive purposes only and should not be construed as indicating or implying relative importance or implicitly indicating a quantity of technical features indicated.

In embodiments of this application, the terms such as “example” or “for example” are used to represent giving an example, an illustration, or a description. Any embodiment or design scheme described by using “example” or “for example” in embodiments of this application should not be explained as being more preferred or having more advantages than another embodiment or design scheme. In particular, the terms such as “example” or “for example” are intended to present a related concept in a specific manner.

Before illustration of solutions of embodiments of this application, the following first introduces relevant terms related in this application.

1. Preview Image

The preview image refers to an image for user preview. The preview image includes an image in a framing interface that is displayed by an electronic device like a mobile phone or a tablet through a camera application.

The mobile phone is used as an example. The mobile phone may display a framing interface 101 shown in FIG. 1A and FIG. 1B before shooting. The framing interface 101 includes an image captured by a camera, and the image is for user preview. In this case, the image displayed in the framing interface 101 is the preview image.

The mobile phone is still used as an example. The mobile phone may display a framing interface 102 shown in FIG. 1A and FIG. 1B during video recording. The framing interface 102 also includes an image captured by a camera, and the image is for user preview. In this case, the image displayed in the framing interface 102 is also the preview image.

2. Human Face Angle (Also Referred to as Human Face Yaw Angle)

The human face angle refers to a left/right rotation angle of an orientation of the face of a photographed person relative to a connection line (namely, a first connection line) between a camera and the head of the photographed person. Assuming that the head is left-right symmetrical, a point on the bisector of the head may be connected to the camera.

Figure 2:
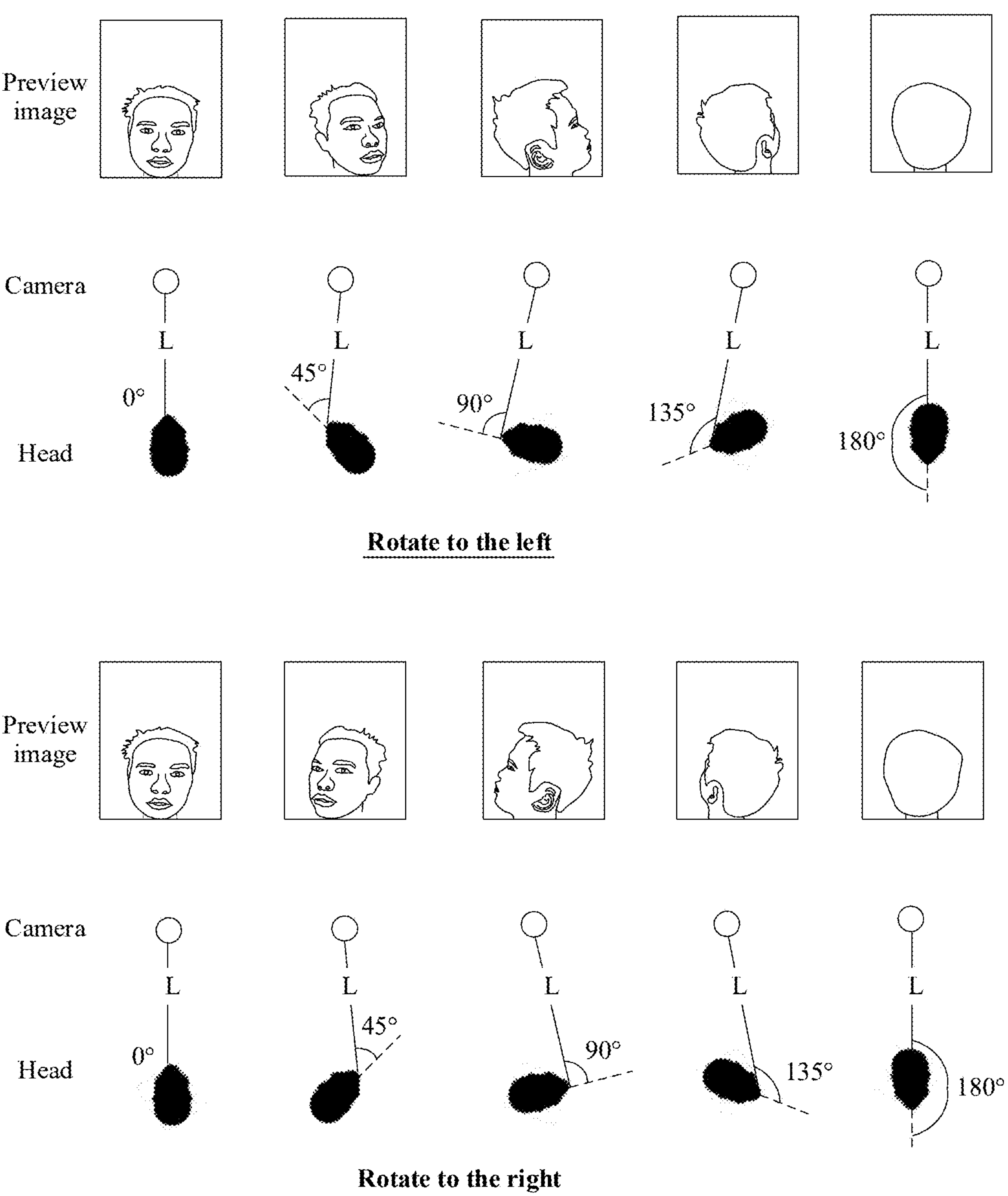
FIG. 2 is a diagram of a human face angle according to an embodiment of this application.

For example, as shown in FIG. 2, L is a connection line between a camera and the head of a photographed person. As the face rotates from the front to the left, an angle between a face orientation and L changes from 0° to 180°. Correspondingly, a direction of the face in a preview image captured by the camera also changes. As the face rotates from the front to the right, an angle between a face orientation and L changes from 0° to 180°. Correspondingly, a direction of the face in a preview image captured by the camera also changes.

3. Human Face Keypoints

Figure 3:
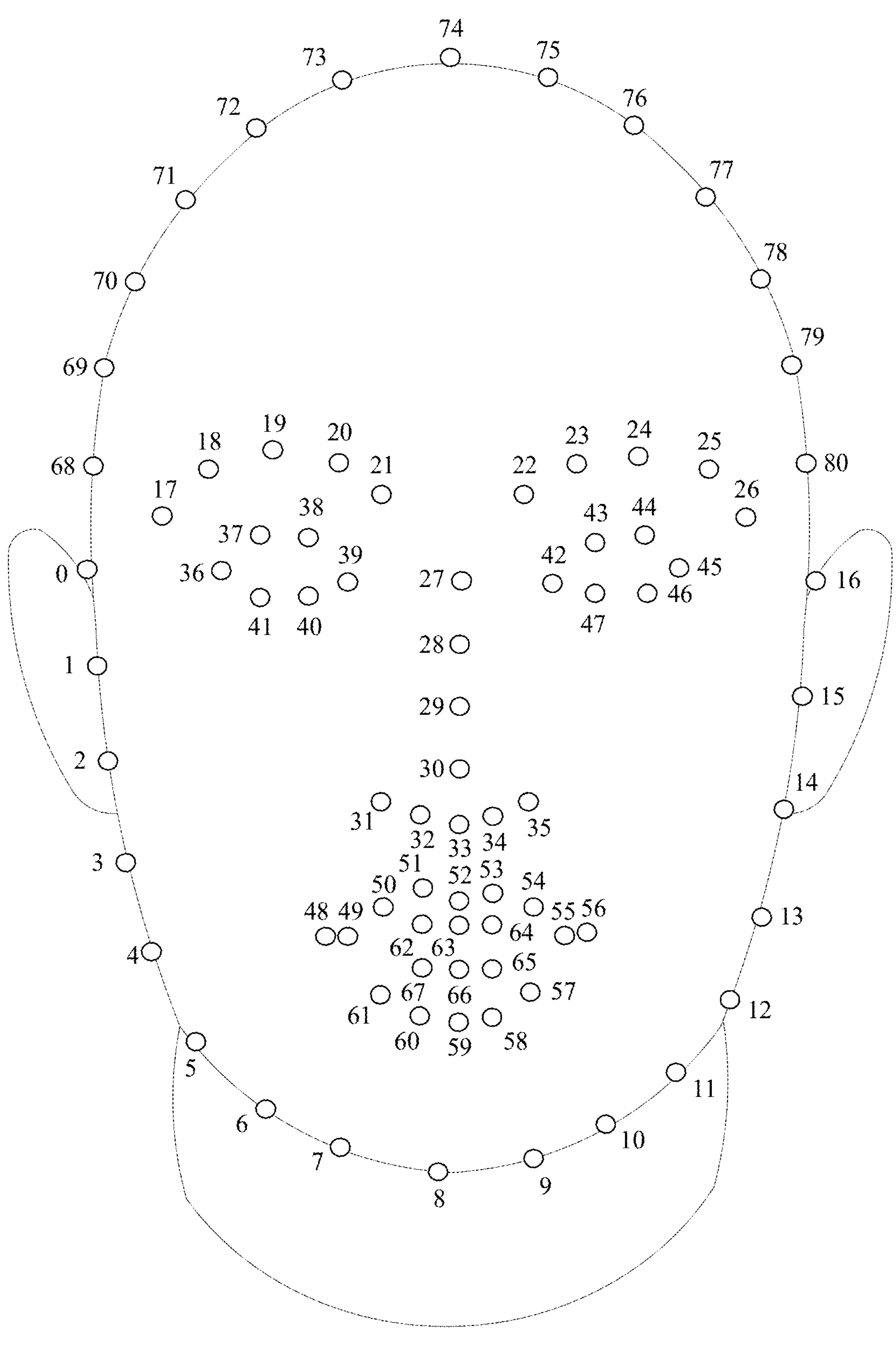
FIG. 3 is a diagram of a human face keypoint according to an embodiment of this application.

The human face keypoints include points of eyebrows, eyes, nose, mouth, and contour areas of a face. For example, feature points of a face may be 81 points from a point 0 to a point 80 shown in FIG. 3. It should be understood that, during practical implementation, a quantity of feature points may be more or less than the 81 points shown in FIG. 3.

As shown in FIG. 2, a quantity of human face keypoints in a preview image captured by a camera and relative positions of the keypoints vary with a change of a human face angle. The quantity of the keypoints is used as an example. When the human face angle is 0°, the quantity of human face keypoints in the captured preview image are relatively complete; and when the human face angle is 90°, the quantity of human face keypoints in the captured preview image are about a half of those when the human face angle is 0°. In other words, the human face keypoint in the preview image is related to the human face angle of the photographed person.

Based on this, in some embodiments, the human face angle can be calculated by detecting the human face keypoint in preview image.

Certainly, the manner of calculating the human face angle is not limited thereto, and during practical implementation, a person skilled in the art can have flexible selections according to actual requirements. For example, the face in the preview image may alternatively be converted into a three dimensional portrait, and then the human face angle may be determined based on the three dimensional portrait. A manner of detecting a human face keypoint is mainly used as an example below for description.

4. Looking Back

The looking back refers to a process of turning from the back or the side to a front face, for example, as shown in FIG. 2, a process of turning left or right from a human face angle of 135° or 90° to a human face angle of 0°.

The image capture method provided in embodiments of this application may be used to capture a highlight frame at the end of looking back (referred to as the highlight frame of looking back).

5. Artificial Intelligence (Artificial Intelligence, AI) Capture Function

The AI capture function is a smart capture function provided by a camera application. The AI capture function is different from manual capture and does not need a user to manually operate to implement capture. The AI capture function can be used to capture highlight frames, such as an image frame of a successful ball shooting, an image frame of jumping to a highest point, a highlight frame at the end of a looking back action, and an image frame of a specific photographed object like rainbow/sunset. This is not specifically limited in embodiments of this application. In the embodiments of this application, a specific implementation of capturing a highlight frame of looking back by using the AI capture function is mainly described.

The image capture method provided in embodiments of this application may be applied to a scenario in which an electronic device like a mobile phone and a tablet uses a camera application, and a highlight frame of looking back can be captured in this scenario.

Figure 1B:

For example, according to the image capture method provided in embodiments of this application, in a process of displaying the framing interface 101 shown in FIG. 1A and FIG. 1B on the mobile phone (which may be before taking a photo, or before recording a video), a highlight frame of looking back can be determined from a preview image and stored.

For another example, according to the image capture method provided in embodiments of this application, in a process of displaying the framing interface 102 shown in FIG. 1A and FIG. 1B on the mobile phone (that is, in a process of recording a video), a highlight frame of looking back can be determined from a preview image and stored.

The following describes the solutions of this application.

In the foregoing scenario, according to the image capture method provided in embodiments of this application, the electronic device may capture a $1^{st}$ frame of preview image, a $2^{nd}$ frame of preview image, and the like via a camera in real time, and obtain a human face angle in each frame of preview image after capturing the frame of preview image. During a looking back process, there is a change in the human face angle. Based on this, the electronic device may detect a highlight frame of looking back based on human face angles in a currently captured preview image (also referred to as a $k^{th}$ frame of preview image) and a plurality of continuous frames of preview images prior to the $k^{th}$ frame of preview image. If the highlight frame of looking back is detected, the highlight frame of looking back is stored. If no highlight frames of looking back exist, a human face angle of a new preview image is continuously obtained and detection is continuously performed.

Figure 4:
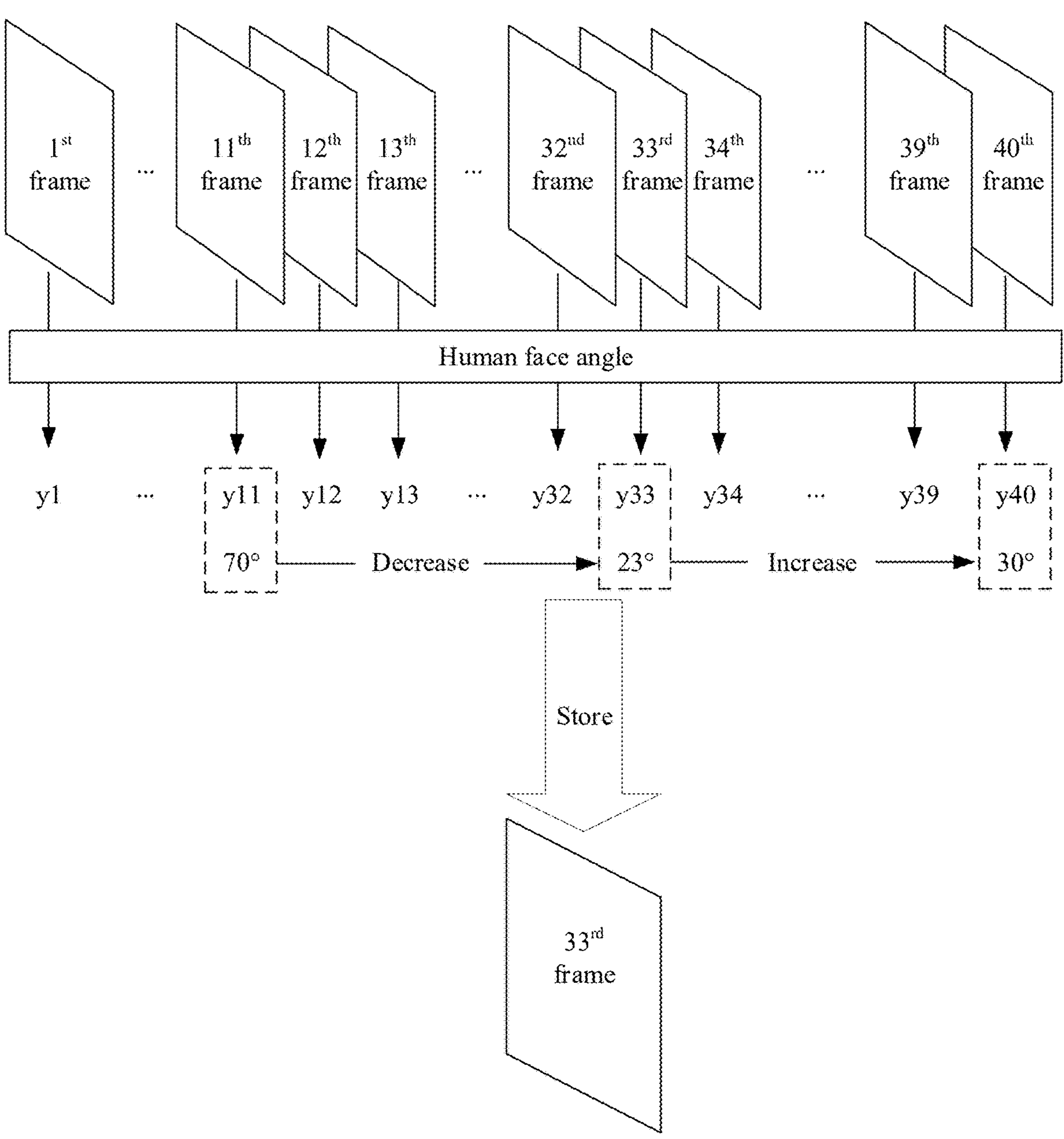
FIG. 4 is a diagram of an image capture principle according to an embodiment of this application.

For example, as shown in FIG. 4, as the camera captures a preview image, such as captures a $33^{rd}$ (that is, k=33) frame of preview image, the electronic device may obtain human face angles from a $1^{st}$ frame of preview image to the $33^{rd}$ frame of preview image, such as y1, y2, y3, . . . , and y33 in sequence. In this case, the electronic device may detect a highlight frame of looking back based on the human face angle y33 in the $33^{rd}$ frame of preview image and human face angles in a plurality of continuous frames of preview images prior to the $33^{rd}$ frame of preview image. For example, in the 11th frame of preview image to the $33^{rd}$ frame of preview image, human face angles (that is, y11, y12, y13, . . . , and y33) decrease from a large human face angle of 70° to a small human face angle of 23°, it can be detected that the $33^{rd}$ frame of preview image is a highlight frame of looking back. In this case, the electronic device may store the $33^{rd}$ frame of preview image.

The electronic device may include a smart phone (smart phone), a personal digital assistant (personal digital assistant, PDA) computer, a tablet computer, a handheld computer, a laptop computer (laptop computer), a video camera, a video recorder, a camera, smartwatch (smartwatch), a smart wristband (smart wristband), a cellular phone, an in-vehicle computer, and another device having a camera application. A specific form of the electronic device is not specially limited in embodiments of this application.

Figure 5:
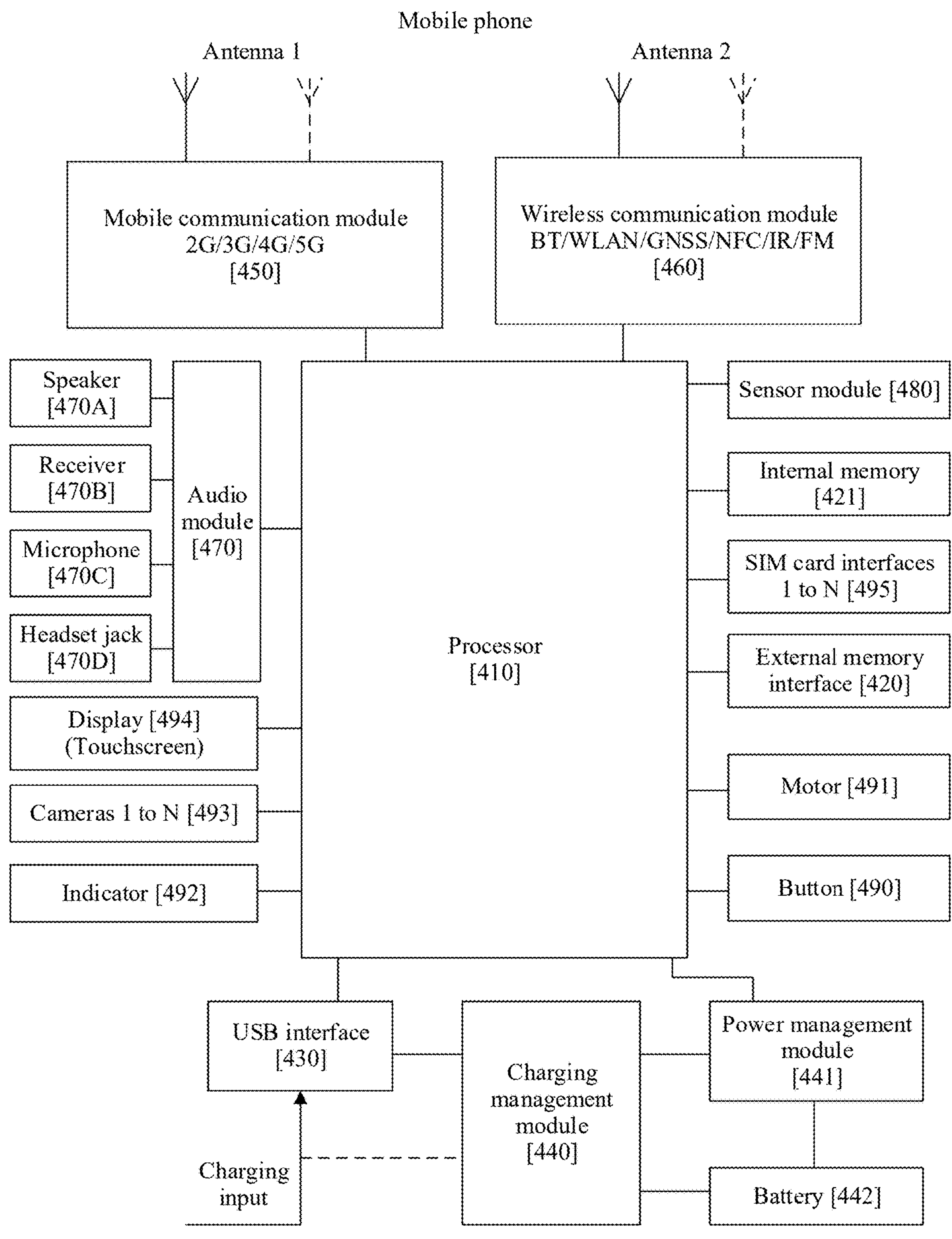
FIG. 5 is a diagram of a hardware structure of an electronic device according to an embodiment of this application.

FIG. 5 is a diagram of a hardware structure of an electronic device according to an embodiment of this application. As shown in FIG. 5, an example in which the electronic device is a mobile phone is used. The electronic device may include a processor 410, an external memory interface 420, an internal memory 421, a universal serial bus (universal serial bus, USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a button 490, a motor 491, an indicator 492, a camera 493, a display 494, a subscriber identification module (subscriber identification module, SIM) card interface 495, and the like.

It may be understood that, a structure illustrated in this embodiment does not constitute a specific limitation on the electronic device. In some other embodiments, the electronic device may include more or fewer components than those shown in the figure, or some components may be combined, or some components may be split, or a different component arrangement may be used. The components in the figure may be implemented by hardware, software or a combination of software and hardware.

The processor 410 may include one or more processing units, for example, the processor 410 may include an application processor (application processor, AP), a modem processor, a graphics processing unit (graphics processing unit, GPU), an image signal processor (image signal processor, ISP), a controller, memory, a video codec, a digital signal processor (digital signal processor, DSP), a baseband processor, a neural-network processing unit (neural-network processing unit, NPU), and/or the like. Different processing units may be separate devices, or may be integrated into one or more processors.

In some embodiments, the processor 410 may complete related processing of AI capture, and determine and store a highlight frame of looking back.

The charging management module 440 is configured to receive a charging input from a charger. The charger may be a wireless charger or may be a wired charger. The power management module 441 is configured to connect to the battery 442, the charging management module 440, and the processor 410. The power management module 441 receives an input from the battery 442 and/or the charging management module 440, and supplies power to the processor 410, the internal memory 421, an external memory, the display 494, the camera 493, the wireless communication module 460, and the like.

A wireless communication function of the electronic device may be implemented through the antenna 1, the antenna 2, the mobile communication module 450, the wireless communication module 460, the modem processor, the baseband processor, and the like.

The mobile communication module 450 may provide a wireless communication solution that includes 2G/3G/4G/5G or the like and that is applied to the electronic device. The mobile communication module 450 may include at least one filter, a switch, a power amplifier, a low noise amplifier (low noise amplifier, LNA), and the like.

The wireless communication module 460 may provide a wireless communication solution that is applied to the electronic device and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology.

The electronic device implements a display function by using the GPU, the display 494, the application processor, and the like. The GPU is a microprocessor for image processing and connects the display 494 to the application processor. The GPU is configured to perform mathematical and geometric calculations, and is configured for image rendering. The processor 410 may include one or more GPUs, and the one or more GPUs execute program instructions to generate or change display information.

The display 494 is configured to display an image, a video, and the like. For example, the display may display the framing interface 101 and the framing interface 102 shown in FIG. 1A and FIG. 1B. The display 494 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like.

The electronic device can implement a photographing function by using the ISP, the camera 493, the video codec, the GPU, the display 494, the application processor, and the like. The ISP is configured to process data fed back by the camera 493. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise and brightness of the image. The ISP may further optimize parameters such as exposure and a color temperature. In some embodiments, the ISP may be disposed in the camera 493.

The camera 493 is configured to capture a static image or a video. An optical image of an object is generated through a lens, and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal of a format like RGB or YUV. In some embodiments, the electronic device may include 1 or N cameras 493. N is a positive integer greater than 1.

The external memory interface 420 may be configured to connect to an external storage card, for example, a micro SD card, to extend a storage capability of the electronic device. The external storage card communicates with the processor 410 through the external memory interface 420, to implement a data storage function. For example, files such as music and a video are stored in the external storage card.

The internal memory 421 may be configured to store computer-executable program code, and the executable program code includes instructions. The processor 410 runs the instructions stored in the internal memory 421, to implement various functional applications and data processing of the electronic device. For example, the processor 410 may execute the instructions stored in the internal memory 421, to respond to an operation of unfolding the display 494 by a user and display different content on the display 494. The internal memory 421 may include a program storage area and a data storage area. The program storage area may store an operating system, an application program required by at least one function (for example, a sound playback function and an image display function), and the like. The data storage area may store data (for example, audio data, and a phone book) created in a process of using the electronic device, and the like. In addition, the internal memory 421 may include a high-speed random access memory, and may further include a nonvolatile memory, for example, at least one magnetic disk storage device, a flash memory device, or a universal flash storage (universal flash storage, UFS).

The electronic device may implement an audio function, for example, music playing and sound recording, by using the audio module 470, the speaker 470A, the receiver 470B, the microphone 470C, the headset jack 470D, the application processor, and the like.

The button 490 includes a power button, a volume button, and the like. The button 490 may be a mechanical button, or may be a touch button. The electronic device may receive a button input, and generate a button signal input related to a user setting and function control of the electronic device. The motor 491 may generate a vibration prompt. The motor 491 may be configured to provide an incoming call vibration prompt or a touch vibration feedback. The indicator 492 may be an indicator light, and may be configured to indicate a charging status and a power change, or may be configured to indicate a message, a missed call, a notification, and the like. The SIM card interface 495 is configured to connect to a SIM card. The SIM card may be inserted into the SIM card interface 495 or removed from the SIM card interface 495, to implement contact with or separation from the electronic device. The electronic device may support one or N SIM card interfaces, where N is a positive integer greater than 1.

A software system of the electronic device may use a layered architecture, an event-driven architecture, a micro-kernel architecture, a micro service architecture, or a cloud architecture. In this embodiment of this application, an Android system with the layered architecture is used as an example to describe a software structure of the electronic device.

Figure 6:
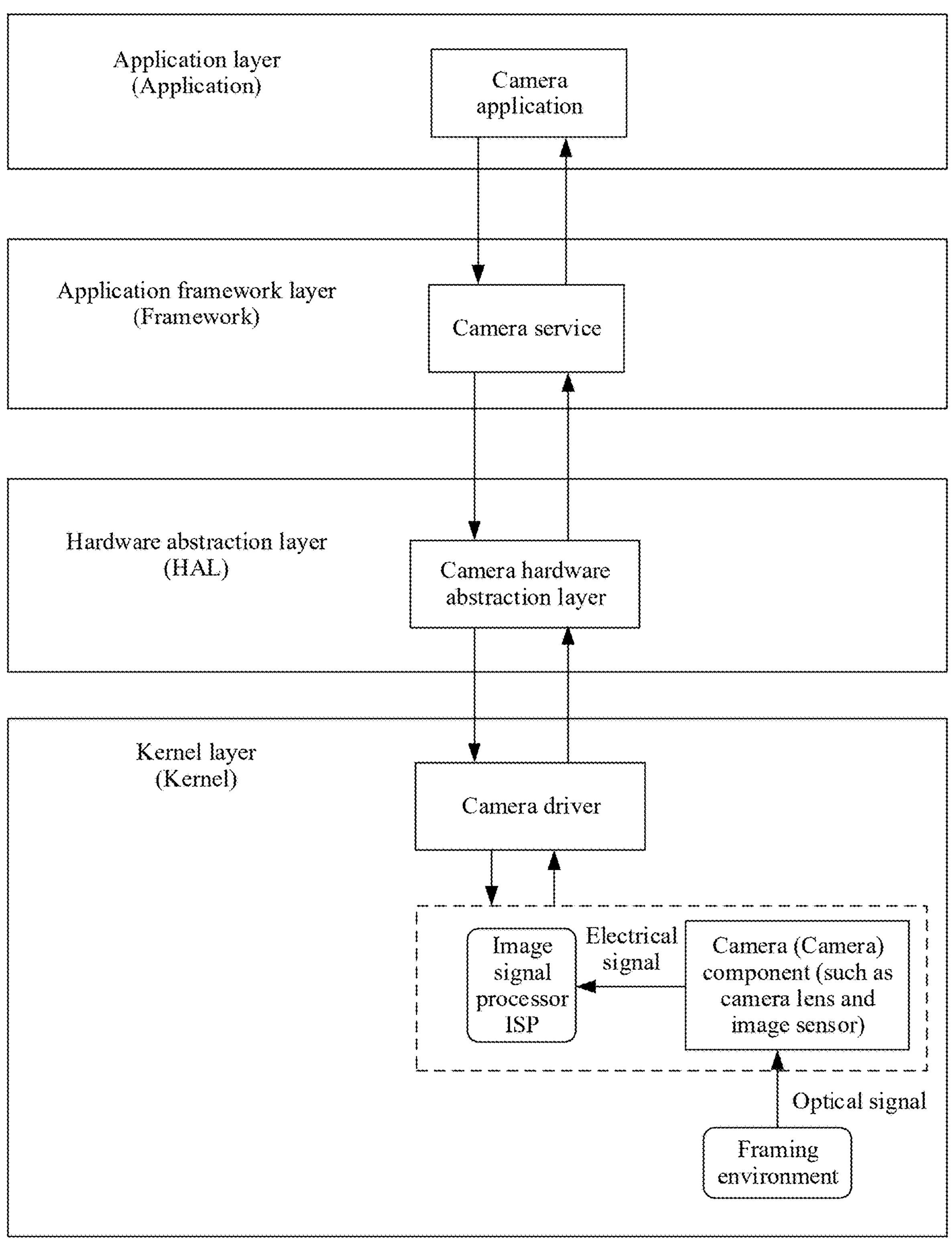
FIG. 6 is a diagram of a software architecture of an electronic device according to an embodiment of this application.
Figure 7A:
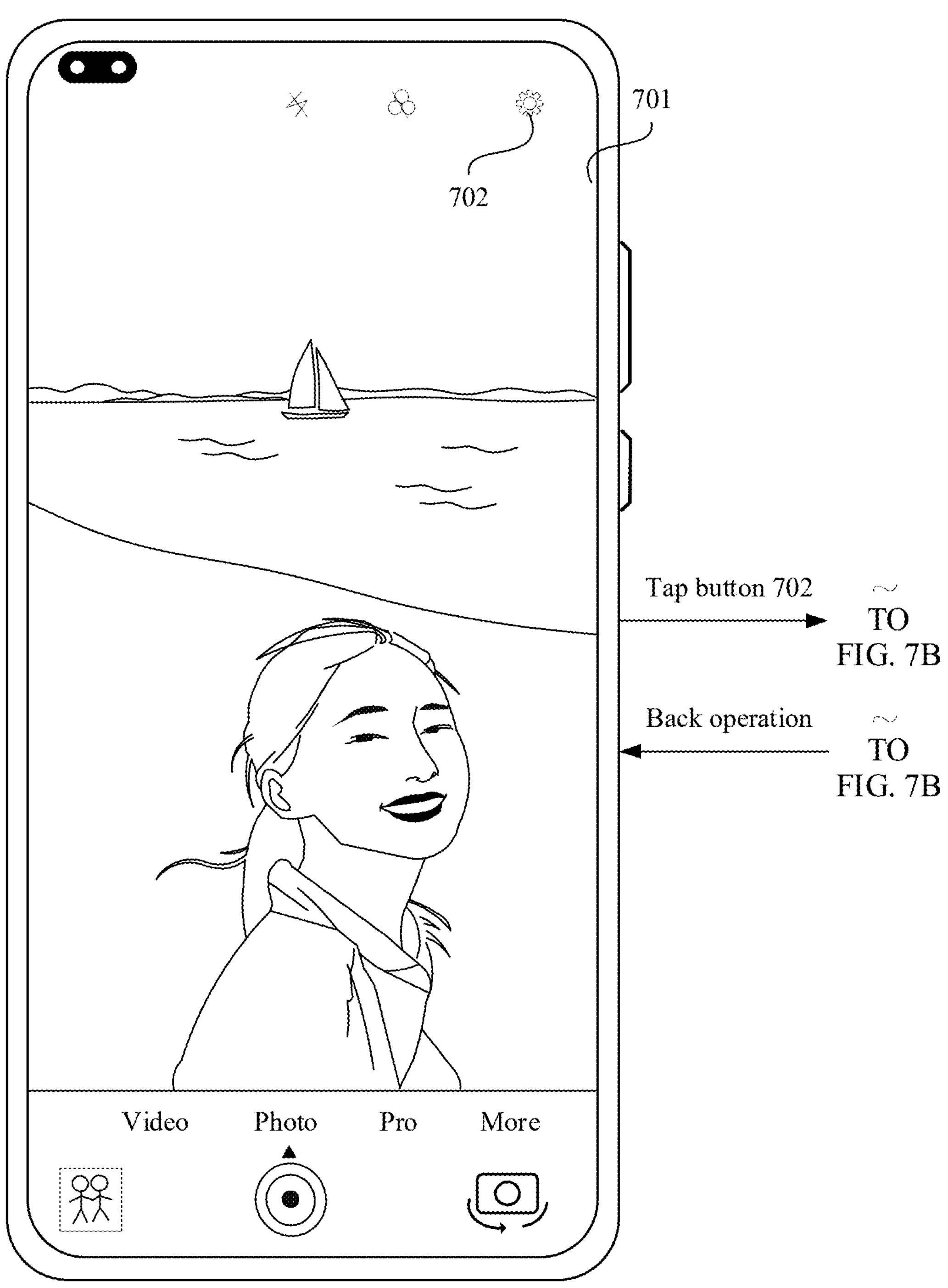
FIG. 7A to FIG. 7D are a diagram of an interface of a mobile phone according to an embodiment of this application.
Figure 7B:
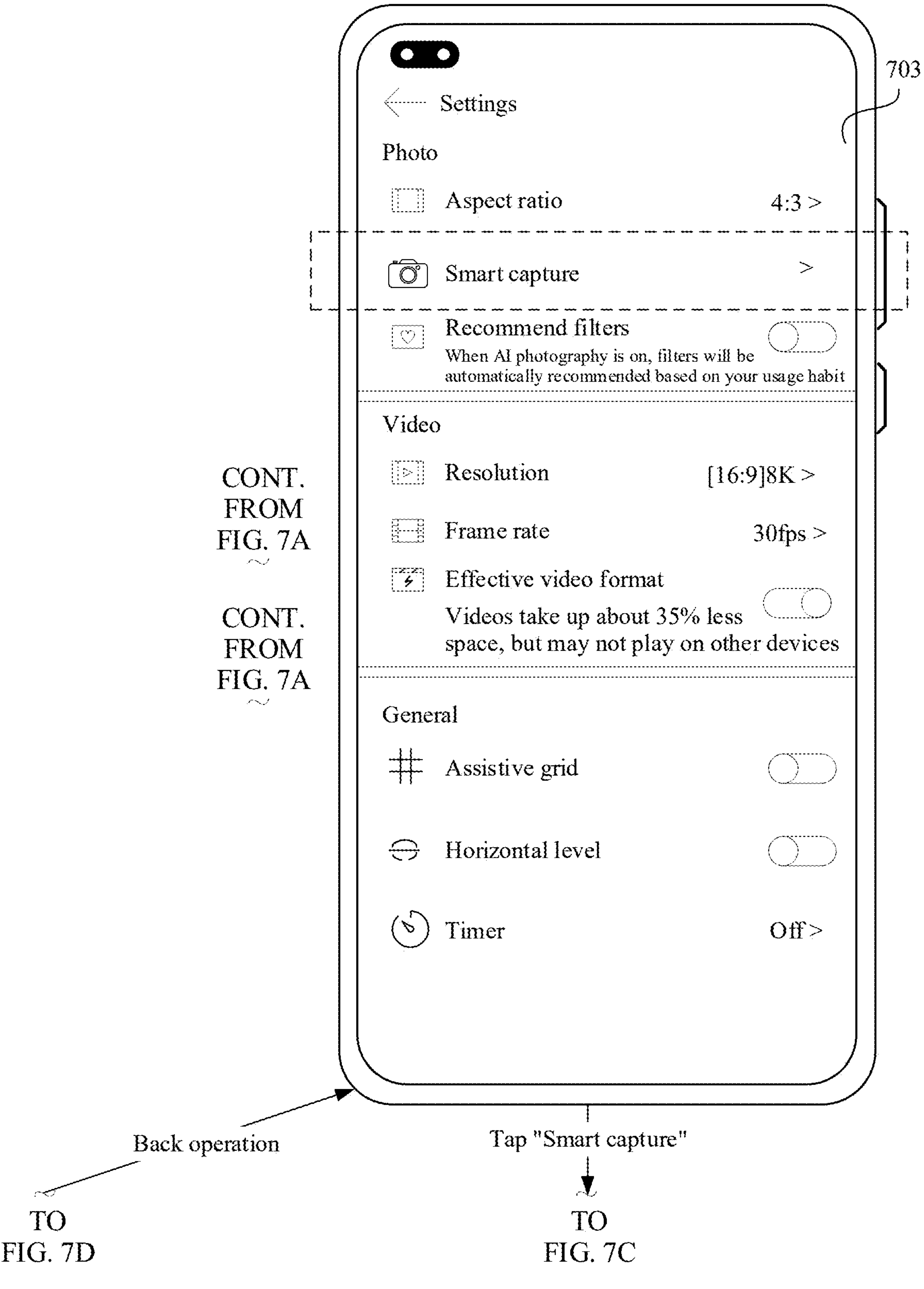
Figure 7C:
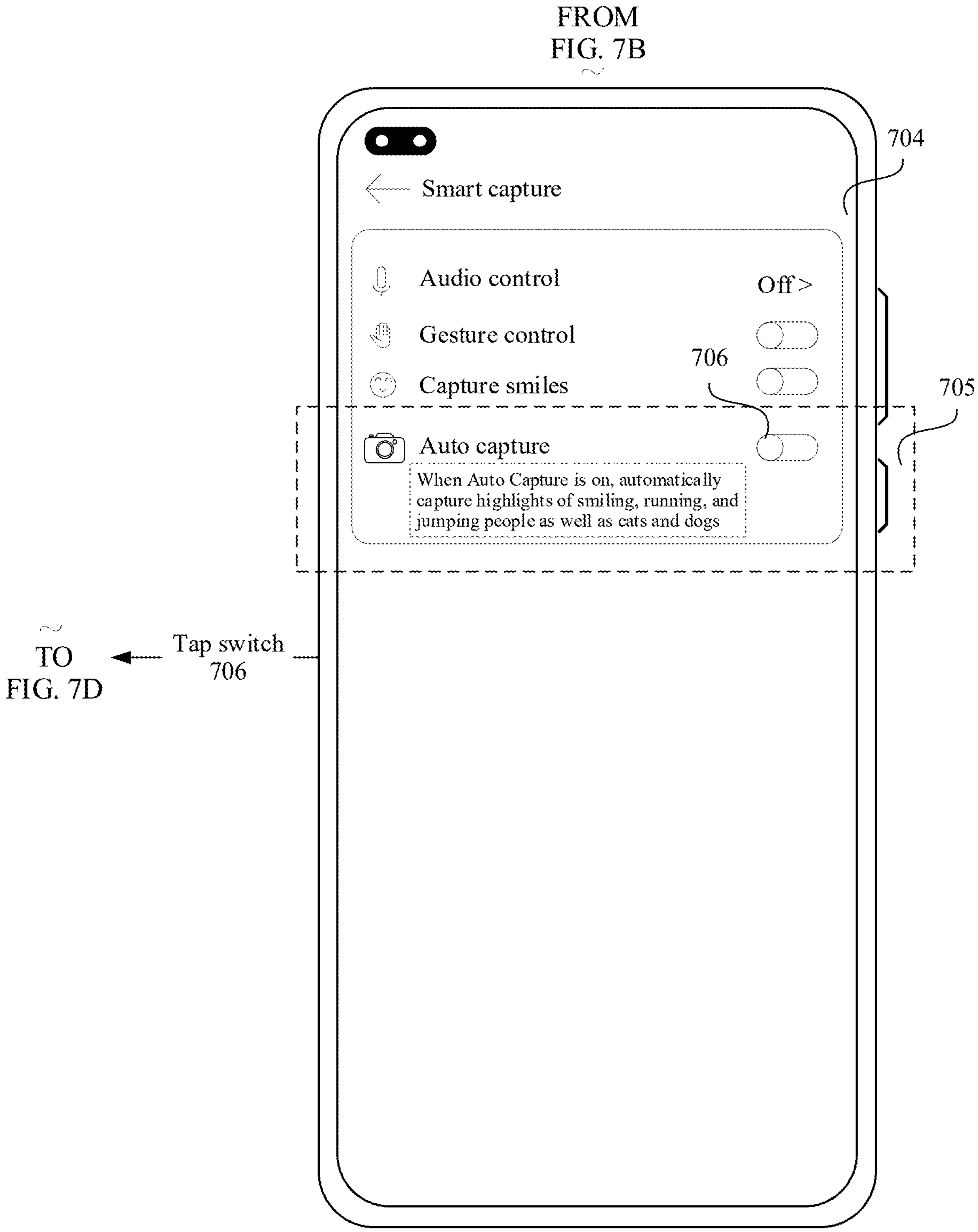
Figure 7D:
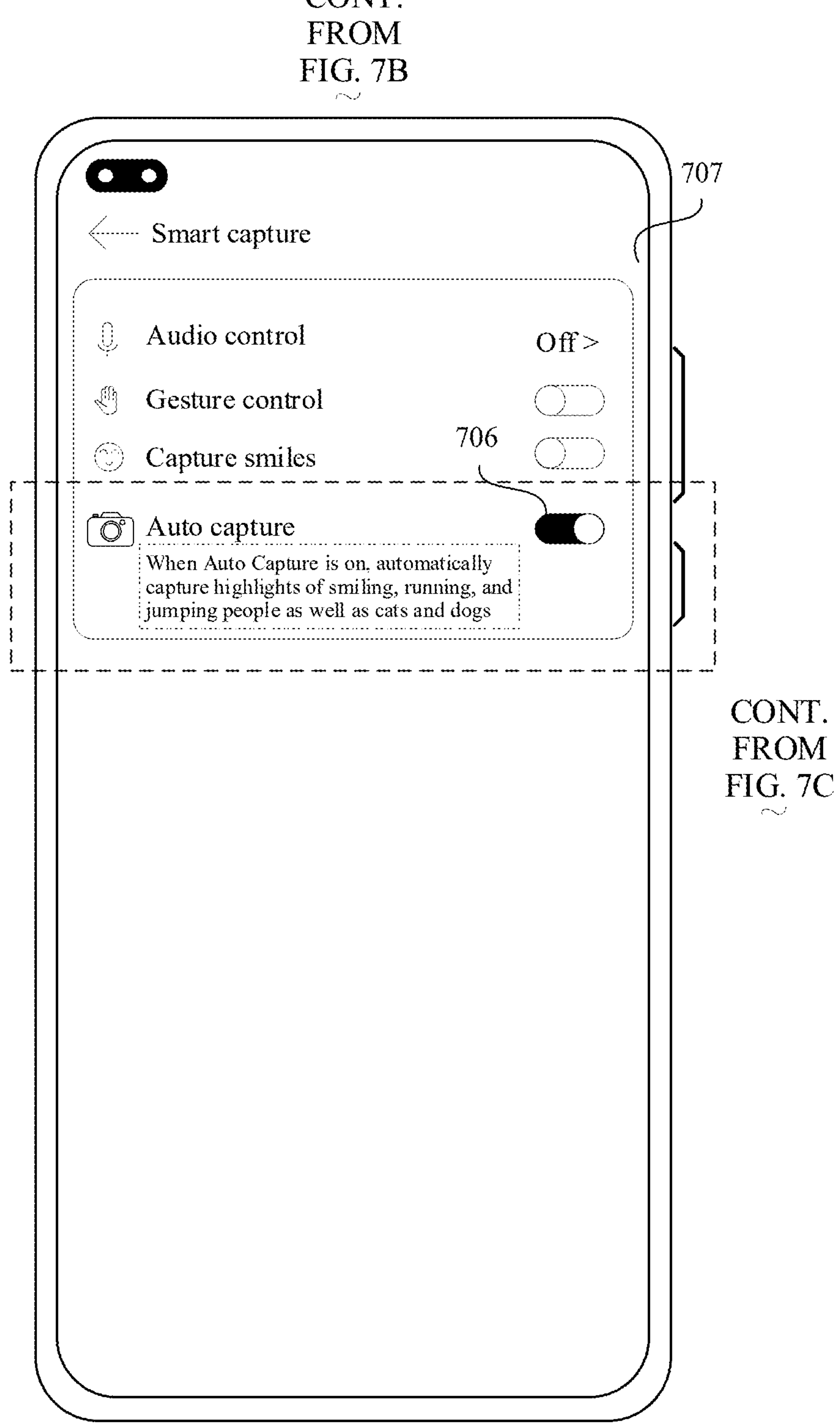

FIG. 6 is a block diagram of a software structure of an electronic device according to an embodiment of this application. As shown in FIG. 6, in a hierarchical architecture, software is divided into several layers, and each layer has a clear role and task. The layers communicate with each other through a software interface. In some embodiments, an android system is divided into four layers: an application program layer (referred to as application layer), an application framework layer (referred to as framework layer), a hardware abstraction layer (hardware abstraction layer, HAL), and a kernel layer (kernel, also referred to as driver layer) from top to bottom.

The application layer (Application) may include a series of application packages. The plurality of application packages may be applications such as Camera, Gallery, Calendar, Phone, Maps, Navigation, WLAN, Bluetooth, Music, Videos, and Messaging.

In embodiments of this application, the application layer may include a system camera application (also referred to as camera application). The camera application may provide functions such as photo taking, video recording, AI capture, and the like.

The camera application may be configured to display a preview image reported from the bottom in a framing interface (such as the framing interface 101 and the framing interface 102 shown in FIG. 1A and FIG. 1B). The electronic device may include a plurality of cameras, and each camera may be configured to capture a preview image.

The framework layer (Framework) provides an application programming interface (application programming interface, API) and a programming framework for the application layer. The framework layer includes some predefined functions. As shown in FIG. 6, the framework layer may provide a camera service.

The camera service may be used to transmit a request from the application layer to a lower layer (such as the HAL layer), such as a request to end shooting, a request to switch cameras, a request to focus, and the like. The camera service may further be used to process preview frame data reported by the lower layer (such as the HAL layer) and upload processed data to the upper application layer.

The HAL layer is an abstraction layer of structure between the kernel layer and android runtime. The HAL layer may be an encapsulation for a hardware driver, providing a unified interface for calling of the upper application layer.

As shown in FIG. 6, the HAL layer includes a camera hardware abstraction layer (camera provider). The camera hardware abstraction layer provides a standard hardware abstraction layer interface definition language (HAL interface definition language) interface to the upper layer (such as the camera service) for calling, to maintain normal communication with the upper layer. The camera hardware abstraction layer controls the kernel layer downwards through a standard HAL interface such as HAL3.0, obtains preview frame data reported by the kernel layer, and reports the data to the upper layer (such as the camera service).

The kernel layer includes a camera driver, an ISP, and a camera component. The camera component may include a plurality of cameras, and each camera includes a camera lens, an image sensor, and the like. The ISP and the camera (such as the camera component) may be disposed separately. In some embodiments, the ISP may be disposed in the camera (such as the camera component).

The ISP and the camera component are main devices for video recording and image shooting. An optical signal reflected by a framing environment may be irradiated on the image sensor via the camera lens, to be converted into an electrical signal. This electrical signal is processed by the ISP and can be used as an original parameter stream (that is, video stream), to be transmitted to the upper layer via driving of the camera. In addition, the camera driver may further receive a notification (such as a notification indicating to turn on or off the camera) from the upper layer, and send a function processing parameter stream to the camera component based on the notification, to turn on or off the corresponding camera.

The image capture method provided in embodiments of this application may be implemented in an electronic device having the foregoing software structure and hardware structure.

Specifically, the image capture method provided in embodiments of this application includes the following three phases: Phase 1: Start AI capture; Phase 2: Capture a highlight frame of looking back; and Phase 3: End the AI capture. The following provides descriptions one by one.

Phase 1: Start AI capture.

In some embodiments, an application setting interface of a camera application of an electronic device includes a control a. The electronic device may receive an operation a (the operation a may be a tap operation, a touch and hold operation, a slide operation, and the like, and the tap operation is used as an example below for description) of a user on the control a. In response to the operation a of the user on the control a, the electronic device may enable an AI capture function. The tap operation is mainly used as an example below for description.

For example, the electronic device is a mobile phone, and the mobile phone may display a framing interface 701 shown in FIG. 7A to FIG. 7D before shooting. The interface 701 includes a setting button 702. In response to a tap operation of the user on the setting button 702, the mobile phone may display an interface 703 shown in FIG. 7A to FIG. 7D. The interface 703 is the application setting interface of the camera application, and the interface 703 includes a "Smart capture" option. In response to a tap operation of the user on the "Smart capture" option in the interface 703, the mobile phone may display an interface 704 shown in FIG. 7A to FIG. 7D. The interface 704 is a setting interface of "Smart capture" (also belonging to the application setting interface of the camera application), the interface 704 includes an "Auto capture" setting option 705, and the "Auto capture" setting option 705 includes a switch 706. A status of the switch 706 in the interface 704 is an off state, and the switch 706 is the control a. In response to a tap operation of the user on the switch 706 in the interface 704, the electronic device may enable the AI capture function. For example, in response to the tap operation of the user on the switch 706 in the interface 704, the electronic device may display an interface 707 shown in FIG. 7A to FIG. 7D. The interface 707 also includes the switch 706, and a status of the switch 706 in the interface 707 is an on state.

In this embodiment, after enabling the AI capture function, in response to triggering a preset event of displaying a framing interface, the electronic device may start AI capture, to capture a highlight frame of looking back.

For example, after enabling the AI capture function, the electronic device may display the interface 707 shown in FIG. 7A to FIG. 7D. In response to a back operation of the user on the interface 707, the mobile phone may display the interface 703 shown in FIG. 7A to FIG. 7D. In response to a back operation of the user on the interface 703, the mobile phone may display the framing interface 701 shown in FIG. 7A to FIG. 7D. In this case, the electronic device starts AI capture. In other words, the preset event is an event of performing the back operation of the user on the interface 703.

For another example, after enabling the AI capture function, in response to a tap operation of the user on an application icon of the camera application in a home screen of the mobile phone, the mobile phone may display a framing interface (namely, the framing interface 101 shown in FIG. 1A and FIG. 1B) before shooting. In this case, the electronic device starts AI capture. In other words, the preset event is an event of performing the tap operation of the user on the application icon of the camera application in the home screen of the mobile phone.

In some other embodiments, the framing interface of the camera application of the electronic device includes a preset control b used for enabling the AI capture function. The electronic device may receive an operation b (the operation b may be a tap operation, a touch and hold operation, a slide operation, and the like, and the tap operation is used as an example below for description) of the user on the control b. In response to the operation b of the user on the control b, the electronic device may enable the AI capture function and start AI capture at the same time, to capture a highlight frame of looking back.

Figure 8:
FIG. 8 is a diagram of an interface of a mobile phone according to an embodiment of this application.

Still in the example in which the electronic device is the mobile phone, the control b is an icon 802 in a framing interface 801 shown in FIG. 8, and the mobile phone may display the framing interface 801 shown in FIG. 8 before shooting. The interface 801 includes the icon 802. The mobile phone may receive a tap operation of the user on the icon 802, and in response to the tap operation of the user on the icon 802, the mobile phone may enable the AI capture function and start AI capture at the same time.

Phase 2: Capture a highlight frame of looking back.

Figure 9:
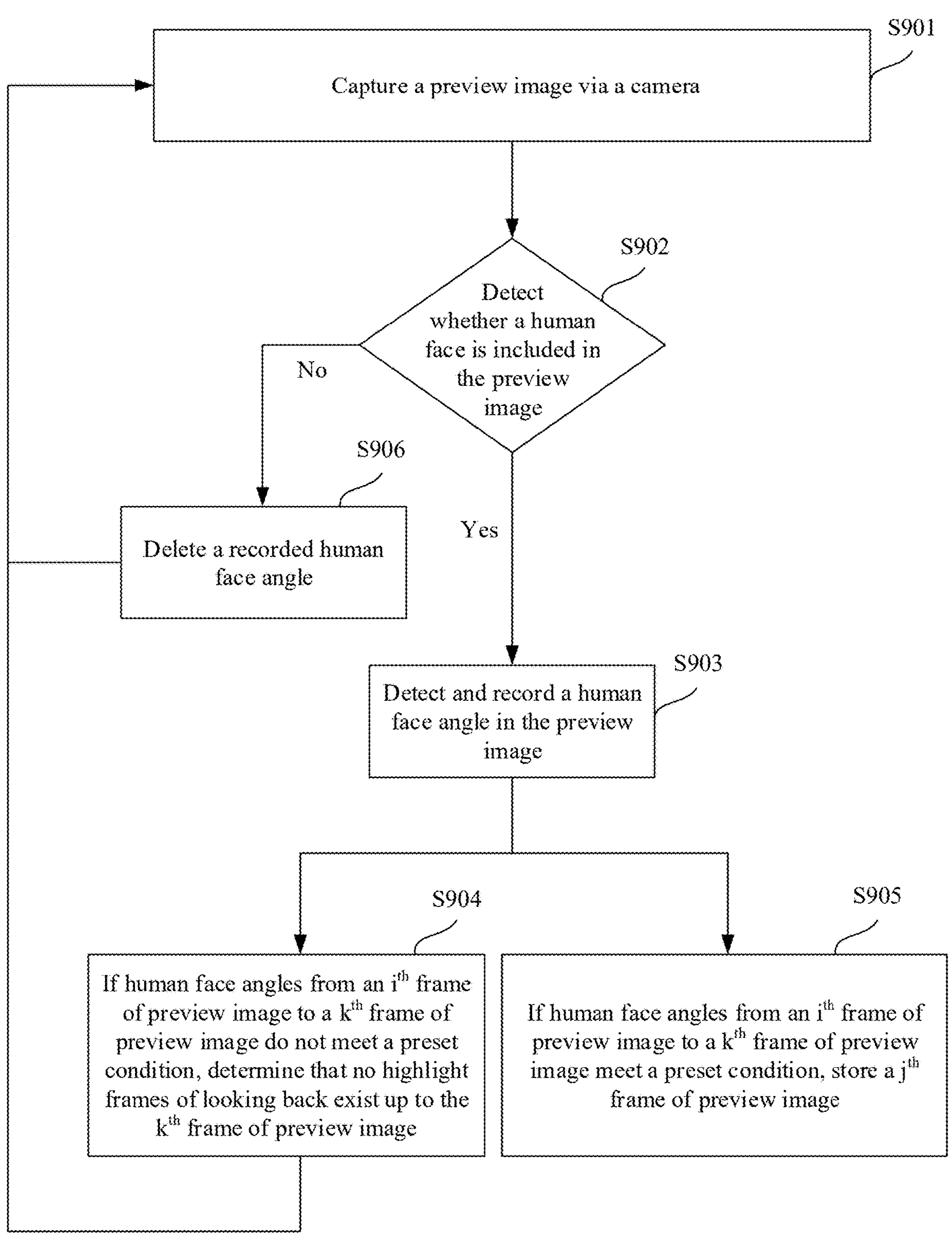
FIG. 9 is a schematic flowchart of an image capture method according to an embodiment of this application.

As shown in FIG. 9, a process of capturing a highlight frame of looking back by using the AI capture function includes the following steps.

S901: Capture a preview image via a camera.

During a process of displaying the framing interface, the camera application of the electronic device continuously requests new preview images from the camera. Correspondingly, the camera continuously captures preview images and reports the preview images upwards, and finally transmits the preview images to the camera application. The camera application displays the preview images in the framing interface.

For example, after starting the AI capture, the electronic device may sequentially capture a $1^{st}$ frame of preview image, a $2^{nd}$ frame of preview image, a $3^{rd}$ frame of preview image, and the like. For ease of description, a currently captured preview image may be referred to as a $k^{th}$ frame of preview image. It should be understood that k continuously increases as the framing interface is continuously displayed.

Figures 10, 11:
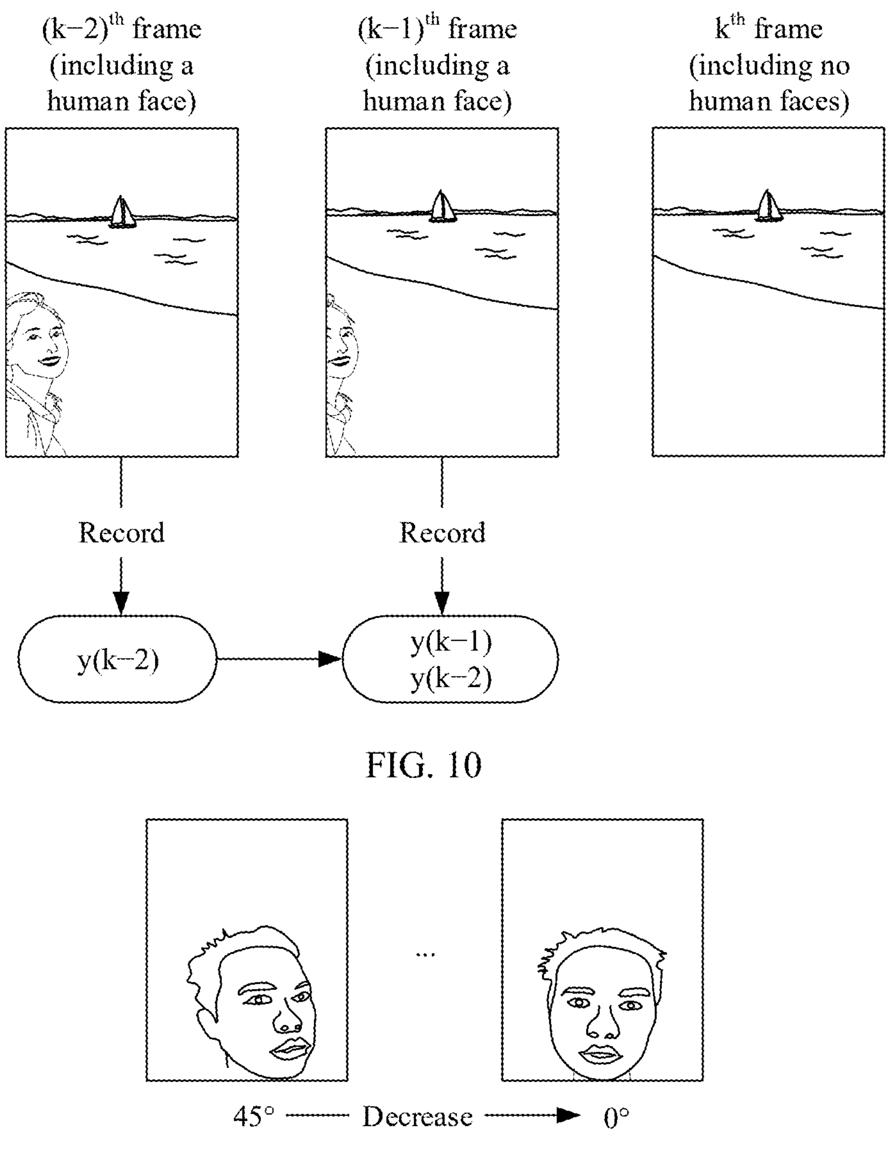
FIG. 10 is a diagram of an image capture principle according to an embodiment of this application.
FIG. 11 is a diagram of a motion other than looking back.

In some cases, a preview image may include no human faces. However, during a looking back process, all preview images should include a human face, and there is usually no possibility that a preview image includes no human faces during the looking back process. For example, as shown in FIG. 10, a $(k-2)^{th}$ frame of preview image and a $(k-1)^{th}$ frame of preview image both include a human face, and a $k^{th}$ frame of preview image includes no human faces. In this case, the $k^{th}$ frame of preview image is definitely not related to looking back. Therefore, after obtaining the $k^{th}$ frame of preview image, the electronic device first needs to perform the following S902, to find a preview image that is not related to looking back.

S902: Detect whether a human face is included in the preview image. If a human face is included in the preview image, perform S903. If no human faces are included in the preview image, perform S906.

It should be understood that a camera service, a camera hardware abstraction layer, and the like all may obtain the preview image in the process of reporting the preview image upwards from the camera. In some embodiments, after obtaining the preview image, modules, such as the camera service and the camera hardware abstraction layer, that may obtain the preview image during the reporting process may transmit the preview image upwards and detect whether a human face is included in the preview image. In some other embodiments, after obtaining the preview image, the modules that may obtain the preview image may transmit the preview image upwards and send the preview image to a specific detection module to detect whether a human face is included in the preview image.

For example, the electronic device may use a template matching technology, a deep learning algorithm (like a convolutional neural network (Convolutional Neural Network, CNN)) and another manner to detect a human face. This is not specifically limited in embodiments of this application.

If a human face is detected in the preview image, the preview image may be an image captured during the looking back process. In this case, the electronic device performs S903 to further determine the highlight frame of looking back. Otherwise, if no human faces are detected in the preview image, the preview image cannot be an image captured during the looking back process. In this case, the electronic device does not need to perform S903, but instead performs S906, to prevent the preview image having no human faces from interfering with detection.

S903: Detect and record a human face angle of the preview image.

In some embodiments, the electronic device may calculate the human face angle based on a human face keypoint. Specifically, the electronic device detects a human face keypoint in the preview image, after obtaining the human face keypoint, matches the human face keypoint with models for keypoints at various human face angles to determine a target model corresponding to the human face keypoint, and determine a human face angle of the target model as the human face angle in the preview image.

After detecting the human face angle, the electronic device further records the human face angle for subsequent use in determining the highlight frame of looking back based on the human face angle. Still refer to FIG. 10. After detecting that a human face angle in the $(k-2)^{th}$ frame of preview image is y(k−2), the electronic device records y(k−2). Then, after detecting that a human face angle in the $(k-1)^{th}$ frame of preview image is y(k−1), the electronic device records y(k−1).

Next, the electronic device needs to detect whether a highlight frame of looking back exists up to the $k^{th}$ frame of preview image.

The looking back refers to a process of turning from the back or the side to a front face, and correspondingly, human face angles change from large to small. For example, if the human face angles are sequentially from large to small: 70°, 65°, 62°, 60°, . . . , and 25°, it is determined that looking back occurs.

In addition, when a head has a motion other than looking back, a case in which human face angles change from large to small may also occur. For example, when a head is turned from a left 45° to a front face (that is, 0°), a preview image captured by the camera may be as shown in FIG. 11, with a human face angle decreasing from 45° to 0°. However, it is clear that the motion shown in FIG. 11 is not looking back.

Different from a motion similar to that shown in FIG. 11, looking back is a process of changing from a large human face angle to a small human face angle. In other words, a change amplitude in human face angle from large to small is large. Therefore, the electronic device may distinguish between looking back and another motion based on a start value and an end value that change from large to small. If the start value is greater than a first angle threshold and the end value is less than a second angle threshold, it is determined that a motion is looking back. The first angle threshold is greater than the second angle threshold. If the start value is less than or equal to the first angle threshold, and/or the end value is greater than or equal to the second angle threshold, it is determined that a motion is not a looking back process.

For example, the first angle threshold is 65°, the second angle threshold is 30°, and human face angles are sequentially from large to small: 70°, 65°, 62°, 60°, . . . , and 25°.

In this case, the start value of 70° is greater than 65°, and the end value of 25° is less than 30°. Therefore, it can be determined that the motion of 70°, 65°, 62°, 60°, and 25° is looking back. However, as shown in FIG. 11, the start value for the human face angles to change from large to small is 45° which is less than the first angle threshold. Therefore, the motion is not looking back.

In conclusion, a human face angle at the start of looking back is greater than the first angle threshold, and a human face angle at the end of looking back is less than the second angle threshold. In addition, during the process from the start of looking back to the end of looking back, the human face angles change from large to small.

Based on this, in embodiments of this application, for the $k^{th}$ frame of preview image, after performing S901 to S903, the electronic device may perform S904 or S905 below to detect whether a highlight frame of looking back exists up to the $k^{th}$ frame of preview image.

Usually, a looking back action takes a specific time to perform and cannot be completed instantly. Therefore, during a time period in which only a small quantity of preview images are captured after starting AI capture, such as a time period in which 2, 3, or 5 frames of preview images are captured, a look back usually cannot be completed. Therefore, in some embodiments, before performing S903 or S904, the electronic device further needs to determine that k is greater than a preset value, such as 2, 3, 5, and the like. Otherwise, if k is less than or equal to the preset quantity, the electronic device does not need to perform S904 or S905.

In some other embodiments, the electronic device may perform S904 or S905 after each time the electronic device records x(x≥2, and x is an integer) human face angles, to reduce power consumption of the electronic device.

S904: If human face angles from an $i^{th}$ frame of preview image (i≥1, and i is an integer) to the $k^{th}$ frame of preview image (i<k, and k is an integer) do not meet a preset condition, determine that no highlight frames of looking back exist up to the $k^{th}$ frame of preview image, and continue to perform S901 and a subsequent step of S901.

The preset condition includes: Human face angles from the $i^{th}$ frame of preview image to a $j^{th}$ frame of preview image (j≤k, and j is an integer) show a decreasing change trend, and the human face angle of the $i^{th}$ frame of preview image is greater than the first angle threshold, and the human face angle of the $j^{th}$ frame of preview image is less than the second angle threshold. In other words, up to the $k^{th}$ frame, if there is no decreasing motion from a large human face angle to a small human face angle, it is determined that the preset condition is not met.

For example, the first angle threshold is 65°, the second angle threshold is 30°, and human face angles are sequentially: 70°, 65°, 62°, 60°, 55°, 52°, and 48°. Although the human face angles are in a decreasing change trend and 70° is greater than the first angle threshold, 48° is not less than the second angle threshold. Therefore, the preset condition is not met.

For example, the first angle threshold is 65°, the second angle threshold is 30°, and human face angles are sequentially: 40°, 43°, 45°, 42°, 39°, 35°, 32°, and 28°. Although there is a process of decreasing from 45° to 28° and 28° is less than the second angle threshold, 40° is not greater than the first angle threshold. Therefore, the preset condition is not met.

It should be noted that, that human face angles from the $i^{th}$ frame of preview image to a $j^{th}$ frame of preview image (j≤k, and j is an integer) show a decreasing change trend may be: A human face angle of any preview image from the $i^{th}$ frame of preview image to a $(j-1)^{th}$ frame of preview image is greater than a human face angle of a next frame of preview image of the any frame of preview image. For example, if the human face angles from the $i^{th}$ frame of preview image to the $j^{th}$ frame of preview image are sequentially: 70°, 65°, 62°, and 60°, where 70°>65°, 65°>62°, and 62°>60°, that the human face angles from the $i^{th}$ frame of preview image to the $j^{th}$ frame of preview image show a decreasing change trend is met.

In reality, a case in which human face angles do not decrease definitely may also occur for looking back. For example, during a looking back process, if a face pauses for a moment, then human face angles in some frames of preview images may remain unchanged during the looking back process. For example, human face angles recorded by the electronic device are as follows: 70°, 65°, 62°, 60°, 55°, 52°, 48°, 44°, 44°, 41°, 38°, 33°, 30°, 28° and 25°, where two consecutive frames are 44°. For another example, during a looking back process, if the electronic device has a deviation in detecting human face angles, human face angles in some frames of preview images may increase. For example, the electronic device recognizes a human face angle of 41° as 43°, and recorded human face angles may be 70°, 65°, 62°, 60°, 55°, 52°, 48°, 44°, 42°, 43°, 38°, 33°, 30°, 28° and 25°, where 43° is an incorrect human face angle which is greater than the human face angle (42°) in the previous frame of preview image.

Based on this, that human face angles from the $i^{th}$ frame of preview image to a $j^{th}$ frame of preview image (j≤k, and j is an integer) show a decreasing change trend may alternatively be: The human face angles from the $i^{th}$ frame of preview image to the $j^{th}$ frame of preview image show an overall decreasing change trend. The overall decreasing change trend includes: Human face angles of a small quantity of preview images from the $i^{th}$ frame of preview image to the $(j-1)^{th}$ frame of preview image may be slightly greater than or equal to a human face angle of a next frame of preview image of the small quantity of preview images. This prevents increase or unchanging of an extreme small quantity of human face angles from affecting accuracy of determining a highlight frame of looking back.

A specific implementation of determining the decreasing change trend is not limited in embodiments of this application. In practice, a person skilled in the art can have flexibly select corresponding manner for implementation according to actual requirements. The following provides descriptions merely through a specific implementation.

The electronic device may select human face angles through a window, and detect a change trend of human face angles in the window and/or a value relationship between the $1^{st}$ human face angle and another human face angle in the window. A selected human face angle can be changed by sliding the window, to obtain a change trend of more human face angles.

The electronic device may calculate a difference P between an average value of the last n/2 (n>2, and n is an integer) human face angles in the window and an average value of the first n/2 human face angles, and then obtain the change trend of human face angles in the window based on the difference φ.

The calculation formula for the difference φ is as follows:

$$\varphi = \frac{1}{n/2}\sum_{q=n/2+1}^{n} \text{yaw}^q - \frac{1}{n/2}\sum_{q=1}^{n/2}\text{yaw}^q$$

In the foregoing formula, q represents an ordinal number of a human face angle in the window, and $yaw^q$ represents a $q^{th}$ human face angle in the window.

If the difference φ is less than 0, it is determined that the n human face angles in the window show a decreasing change trend. If the difference φ is greater than 0, it is determined that the n human face angles in the window show an increasing change trend. If the difference φ is equal to 0, it is determined that the n human face angles in the window show neither an increasing change trend nor a decreasing change trend.

For example, n=6. As shown in a moment t1 in FIG. 12, human face angles currently selected in the window are 70°, 65°, 62°, 60°, 55°, and 52°. The electronic device calculates an average value of the last three human face angles (60°+55°+52°)/3=55.67°, and an average value of the first three human face angles (70°+65°+62°/3=65.67°). It is clear that, if the difference P is less than 0, it can be determined that 70°, 65°, 62°, 60°, 55°, and 52° show a decreasing change trend.

The electronic device may compare a value of a $1^{st}$ human face angle with values of the other human face angles to obtain a value relationship between the $1^{st}$ human face angle and the other human face angles in the window. The value relationship includes: The $1^{st}$ human face angle is less than all the other human face angles, or another condition in which the $1^{st}$ human face angle is less than all the other human face angles.

Figure 12:
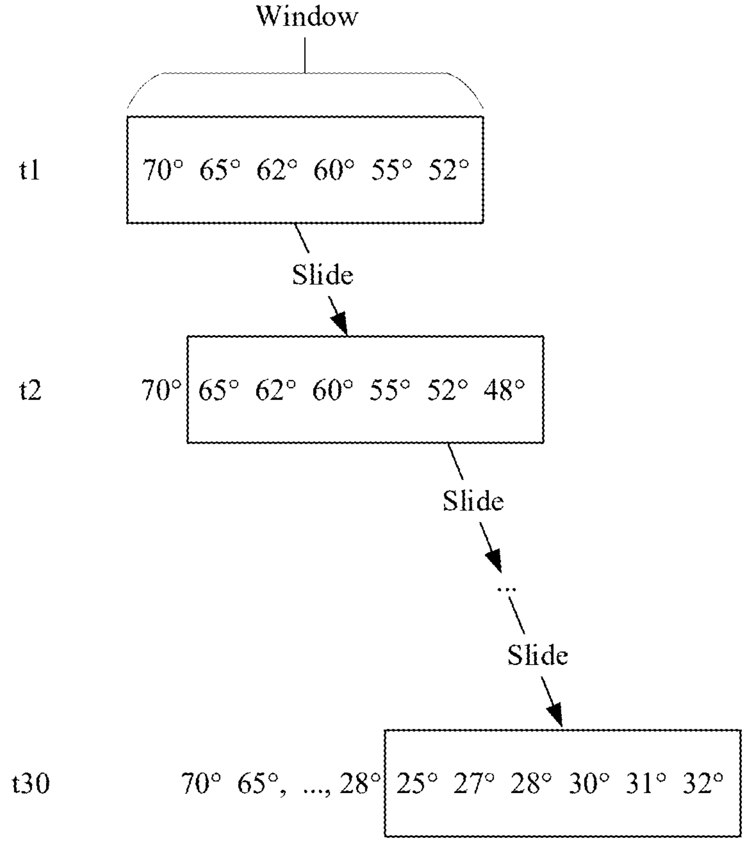
FIG. 12 is a diagram of an image capture principle according to an embodiment of this application.

Still refer to FIG. 12. After sliding of the window, human face angles of 65°, 62°, 60°, 55°, 52°, and 48° at a moment t2 are selected in the window. A $1^{st}$ human face angle is 65°, and the other human face angles include 62°, 60°, 55°, 52°, and 48°. It is clear that the $1^{st}$ human face angle is greater than the other human face angles.

If the electronic device detects a decreasing change trend of human face angles in the window at a moment te, after each sliding of the window, the electronic device detects a value relationship between a $1^{st}$ human face angle and the other human face angles in the window, until the electronic device detects at a moment tf that a $1^{st}$ human face angle is less than all the other human face angles in the window. In this case, it is determined that the $1^{st}$ human face angle selected in the window at the moment the to the $1^{st}$ human face angle selected in the window at the moment tf show a decreasing change trend.

Still refer to FIG. 12. Human face angles of 70°, 65°, 62°, 60°, 55°, and 52° that are selected in the window and that are detected at the moment t1 show a decreasing change trend, that is, te=t1. Subsequently, after each sliding of the window, the electronic device detects a value relationship between a $1^{st}$ human face angle and the other human face angles in the window, until the electronic device detects, at a moment t30 at which human face angles selected in the window are 25°, 27°, 28°, 30°, 31°, and 32°, that a $1^{st}$ human face angle is less than all the other human face angles in the window, that is, tf=t30. In this case, the electronic device may determine that the $1^{st}$ human face angle of 70° selected in the window at the moment t1 to the $1^{st}$ human face angle of 25° selected in the window at the moment t30 show a decreasing change trend all the time.

During actual implementation, the window in this implementation may be a cache (also referred to as a preset storage space), the cache may be used to store a fixed quantity (such as n) of human face angles. Correspondingly, the sliding of window may be: As a new human face angle is stored in the cache, a human face angle first stored in the cache is to be squeezed out, that is, the storage follows a first-in-first-out principle. FIG. 12 is still used as an example, the sliding of window from t1 to t2 shown in FIG. 12 may be: After the new human face angle of 48° is stored in a cache, the human face angle of 70° first stored in the cache is squeezed out; and the sliding of window from t29 to t30 shown in FIG. 12 may be: After the new human face angle of 44° is stored in the cache, the human face angle of 65° first stored in the cache is squeezed out.

S905: If human face angles from an $i^{th}$ frame of preview image (i≥1, and i is an integer) to the $k^{th}$ frame of preview image (i<k, and k is an integer) meet a preset condition, store a $j^{th}$ frame of preview image.

If the human face angles from the $i^{th}$ frame of preview image to the $k^{th}$ frame of preview image meet the preset condition, it indicates a change from a large human face angle in the $i^{th}$ frame of preview image to a small human face angle in the $j^{th}$ frame of preview image, and it is determined that looking back occurs. In this case, the electronic device may store the $j^{th}$ frame of preview image as a highlight frame of looking back.

During video recording, each frame of preview image is stored. In other words, the $k^{th}$ frame of preview image and a previous preview image (such as the $j^{th}$ frame of preview image) of the $k^{th}$ frame of preview image is stored. Therefore, if the AI capture function is used in video recording, after the electronic device determines that the preset condition is met, the electronic device may obtain the $j^{th}$ frame of preview image and store the $j^{th}$ frame of preview image, for example, store the $j^{th}$ frame of preview image in a media storage database. In this way, the user can view the highlight frame of looking back in the gallery.

However, difference with video recording lies in that each preview image is usually not stored before photo taking or video recording. In this case, when the electronic device has obtained the $k^{th}$ frame of preview image, a previous preview image (such as the $j^{th}$ frame of preview image) of the $k^{th}$ frame of preview image usually no longer exists. Therefore, when using the AI capture function before photo taking or video recording, the electronic device may obtain the $k^{th}$ frame of preview image and store the $k^{th}$ frame of preview image.

Certainly, in some embodiments, to capture a true end moment of looking back, when using the AI capture function before photo taking or video recording, the electronic device may cache several latest captured frames of preview images, for example, cache frame of preview images from a $(k-3)^{th}$ frame of preview image to the $k^{th}$ frame of preview image. Then, after determining that the preset condition is met, the electronic device may obtain the $j^{th}$ frame of preview image from the cached preview images and store the $j^{th}$ frame of preview image.

In some embodiments, the electronic device may first display the $j^{th}$ frame of preview image or a thumbnail of the $j^{th}$ frame of preview image before storing the $j^{th}$ frame of preview image. Then, in response to an operation of saving the $j^{th}$ frame of preview image by the user, the electronic device saves the $j^{th}$ frame of preview image. In response to an operation of deleting the $j^{th}$ frame of preview image by the user, the electronic device deletes the $j^{th}$ frame of preview image. This can avoid storing an image that the user is not satisfied with.

Figure 13A:
FIG. 13A to FIG. 13C are a diagram of an interface of a mobile phone according to an embodiment of this application.
Figure 13B:
Figure 13C:
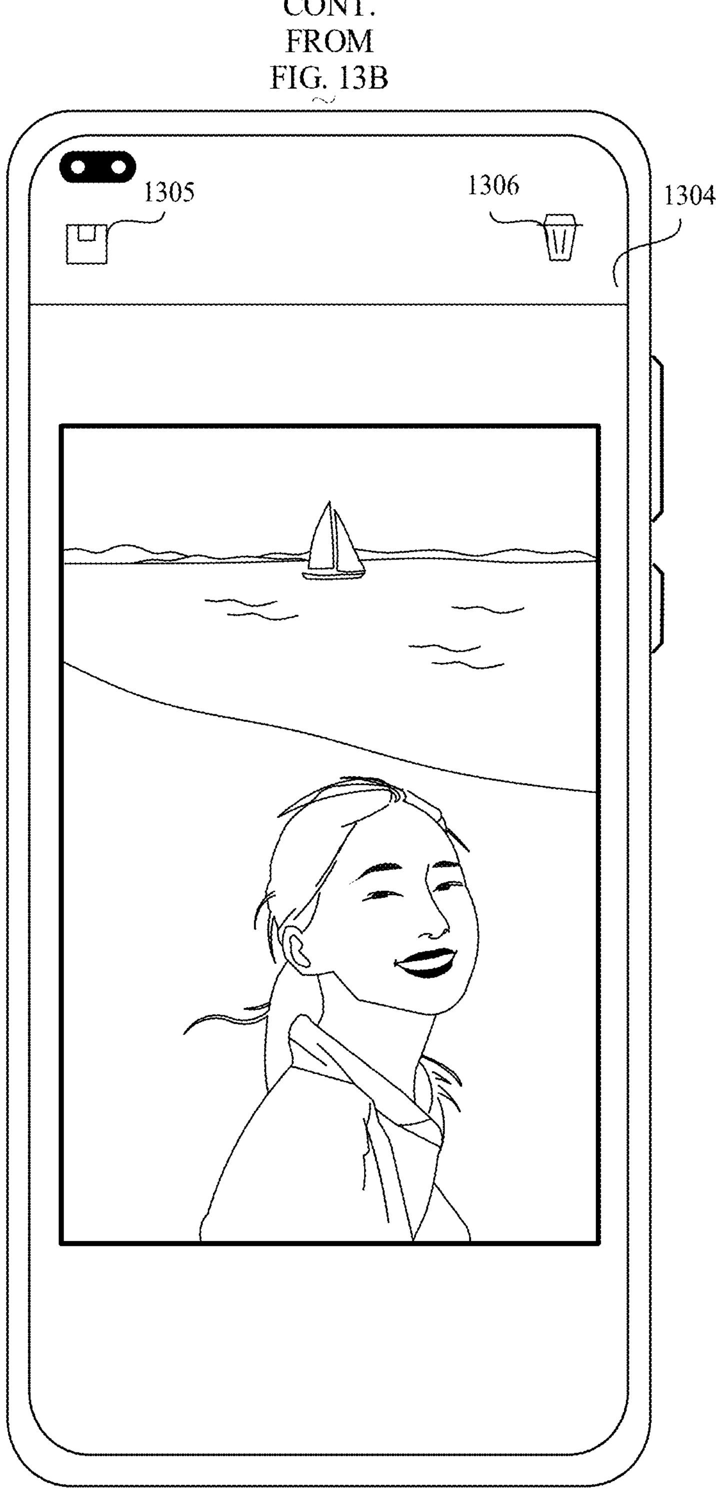

For example, before storing the $j^{th}$ frame of preview image, the mobile phone displays an interface 1301 shown in FIG. 13A to FIG. 13C. In response to generating a captured image, the electronic device may display an interface 1302 shown in FIG. 13A to FIG. 13C. The interface 1302 includes a thumbnail 1303 of the captured image. In response to a tap operation of the user on the thumbnail 1303, the mobile phone may display an interface 1304 shown in FIG. 13A to FIG. 13C, the interface 1304 includes a "save" button 1305 and a "delete" button 1306. In response to a tap operation of the user on the "save" button 1305, the mobile phone may save the captured image. In other words, the saving operation is a tap operation of the user on the "save" button 1305. Alternatively, in response to a tap operation of the user on the "delete" button 1306, the mobile phone may delete the captured image.

In S905, after determining that the $j^{th}$ frame of preview image is the highlight frame of looking back, the $j^{th}$ frame of preview image is directly stored. However, in practice, after determining that the $j^{th}$ frame of preview image is the highlight frame of looking back, the electronic device may first fuse the $j^{th}$ frame of preview image and at least one adjacent frame of preview image before or after the $j^{th}$ frame of preview image to generate a captured image, and then store the captured image. In this way, it can prevent poor quality of the $j^{th}$ frame of preview image from affecting a capture effect.

S906: Delete the recorded human face angle, and continue to perform S901 and a subsequent step of S901.

In some embodiments, if the preview image includes no faces, the electronic device deletes the recorded human face angle. In the subsequent process, the electronic device cannot use the deleted human face angle to determine a highlight frame of looking back. This can avoid using discontinuous human face angles of a human face together to determine a highlight frame of looking back, and improves accuracy of determining the highlight frame of looking back.

Figure 14:
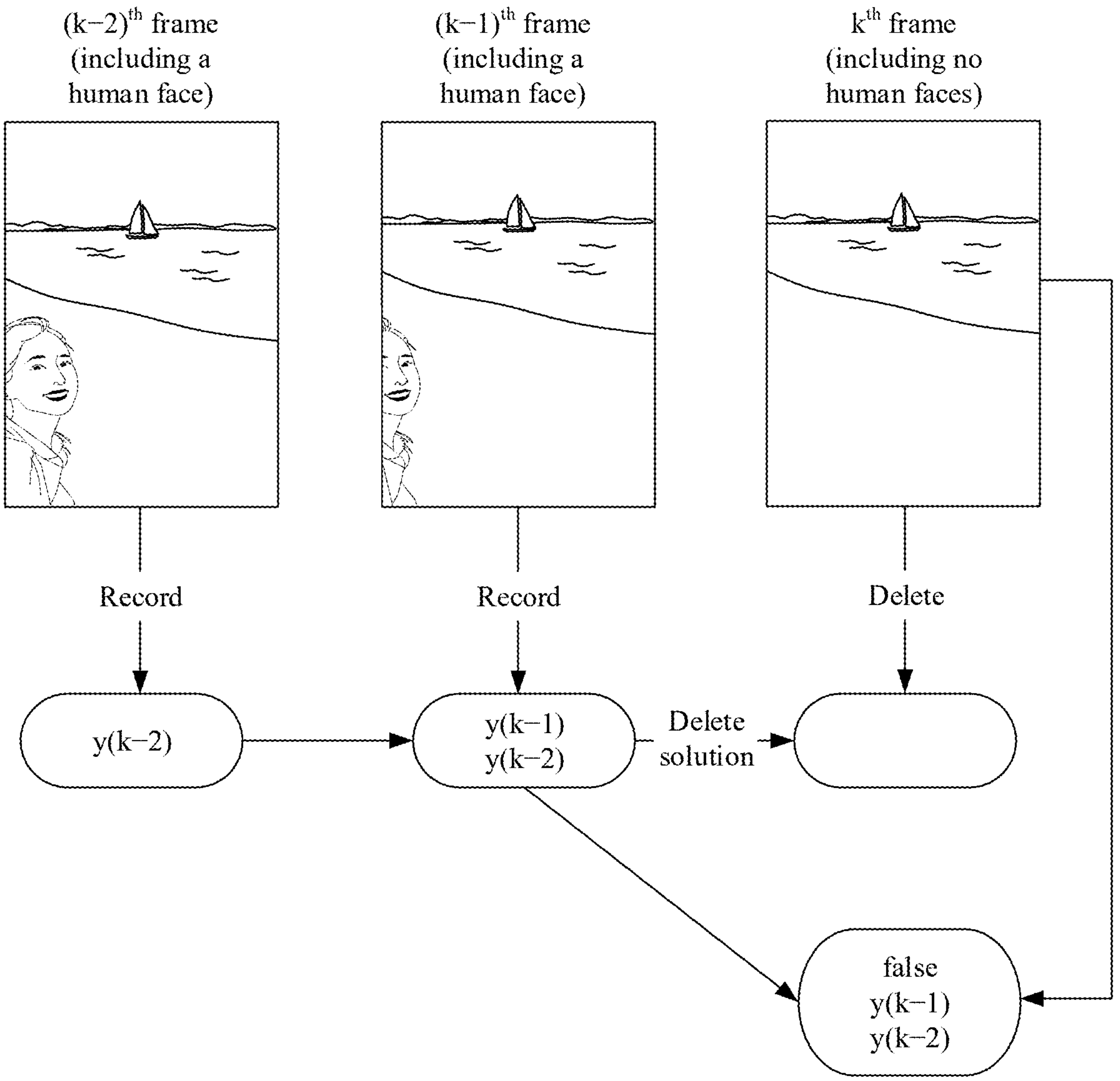
FIG. 14 is a diagram of an image capture principle according to an embodiment of this application.

For example, as shown in FIG. 14, after the electronic device records a human face angle y(k−2) of a $(k-2)^{th}$ frame of preview image and a human face angle y(k−1) of a $(k-1)^{th}$ frame of preview image, if the electronic device detects that a $k^{th}$ frame of preview image includes no faces, the electronic device may delete both y(k−2) and y(k−1) according to a "delete solution" shown in FIG. 14. Subsequently, y(k−2) and y(k−1) are not used with a human face angle detected after the $k^{th}$ frame of preview image, to determine a highlight frame of looking back.

Certainly, for a case in which no faces are included, the electronic device may use another manner to prevent the electronic device from using human face angles of a human face in discontinuous preview images together to determine a highlight frame of looking back. For example, if the preview image includes no faces, the electronic device records, according to a "mark solution" shown in FIG. 14, indication information indicating that no faces exist, for example, records indication information such as NULL and false shown in FIG. 14 indicating that no faces exist. Then, in the subsequent process, the electronic device may use only a human face angle after a preset mark to determine whether a highlight frame of looking back exists. In this specification, an implementation of deleting a human face angle is mainly described.

To be precise, the highlight frame of looking back (namely, an end moment of looking back) should be an image in which a human face angle reaches a smallest value through a change from a large human face angle to a small human face angle.

For example, the second angle threshold is 30°, and human face angles change in 70°, 65°, 62°, . . . , 31°, 28°, 25°, 23°, 24°, 24°, and 26°. Although a condition of being less than the second angle threshold is already met when the human face angle is 28°, the human face angles continue to decrease after 28°, for example, decrease to 25° and 23° in sequence. In this case, the looking back is not yet over. It is not difficult to notice that the human face angles gradually increase after decreasing to 23°, for example, increase to 24°, 24°, and 26° in sequence. In other words, the human face angles gradually increase after decreasing to a smallest value of 23°. In this example, a preview image corresponding to 23° is the highlight frame of looking back.

Based on this, in some embodiments, in addition to the aforementioned preset condition, the preset condition further includes: The human face angle of the $j^{th}$ frame of preview image is a smallest value in human face angles from the $j^{th}$ frame of preview image to the $k^{th}$ frame of preview image.

In other words, in this embodiment, that the preset condition is met indicates that a large human face angle of the $i^{th}$ frame of preview image changes to a small human face angle of the $j^{th}$ frame of preview image, and an angle increase starts from the small human face angle of the $j^{th}$ frame of preview image. In this case, the electronic device may determine the $j^{th}$ frame of preview image as a highlight frame of looking back.

The following uses the preset condition in this embodiment as an example, and further describes a specific implementation of AI capture in detail by using a manner similar to the sliding of a window (the window may be a cache) shown in FIG. 12.

Figure 15A:
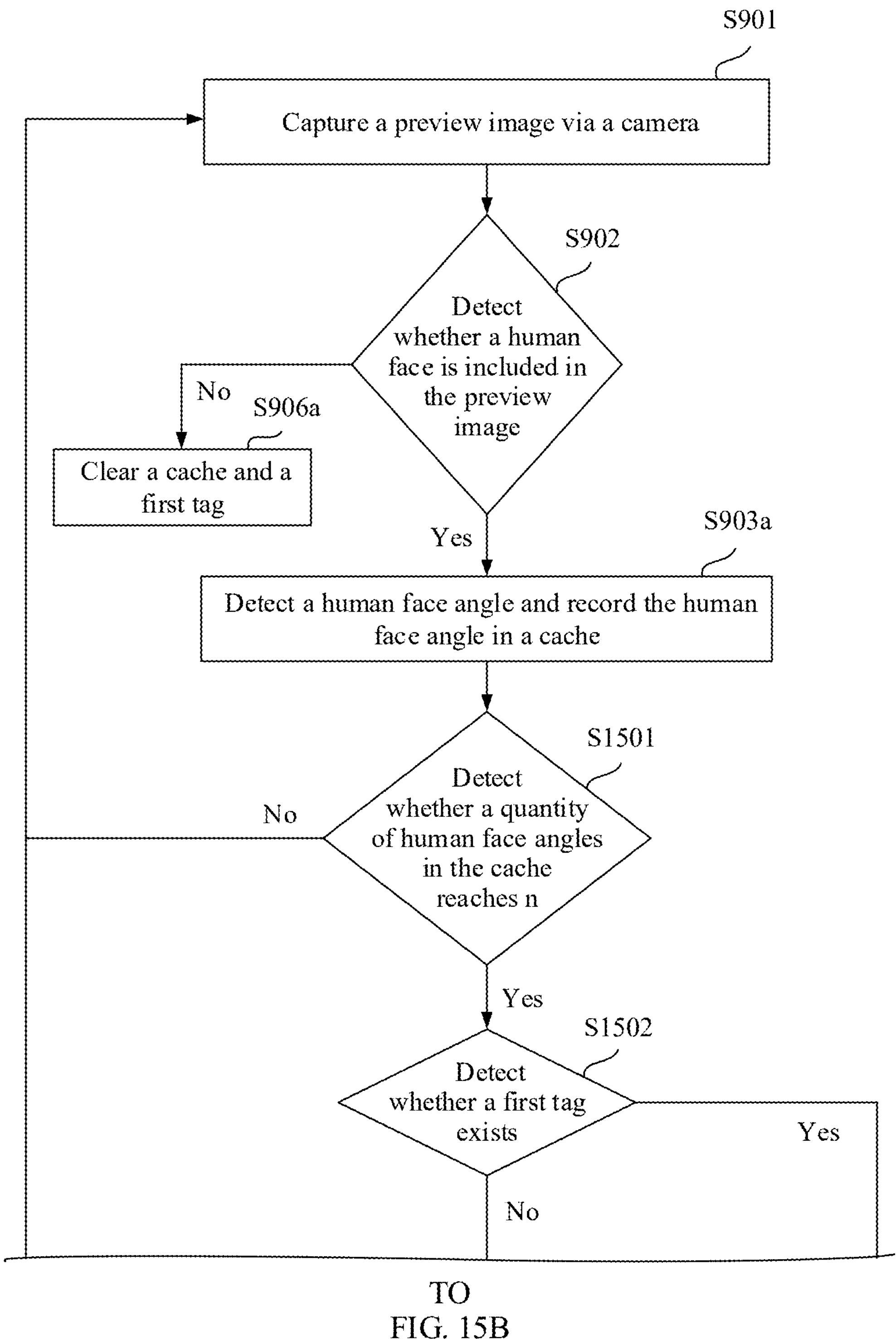
FIG. 15A and FIG. 15B are a schematic flowchart of an image capture method according to an embodiment of this application.
Figure 15B:
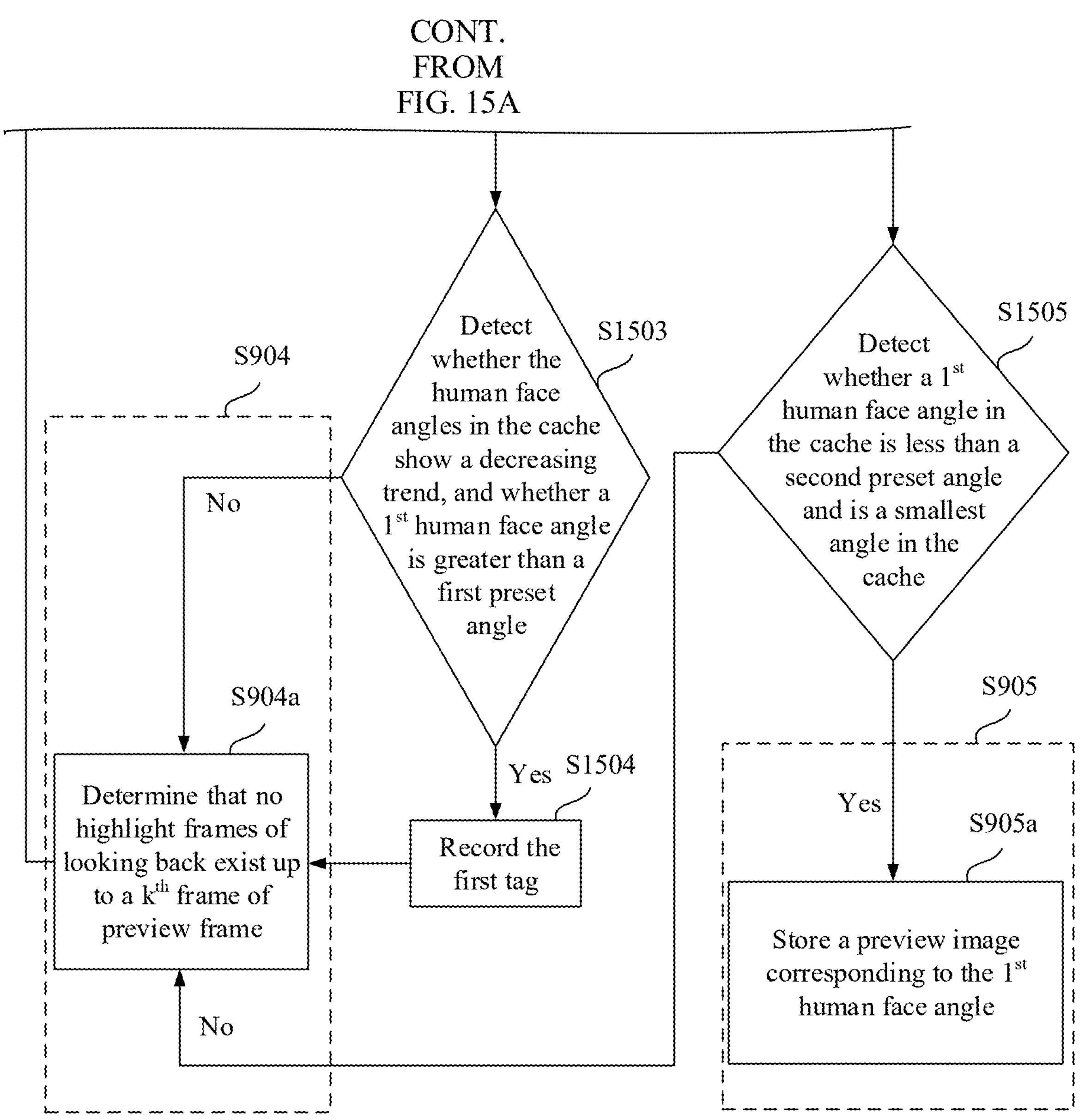

As shown in FIG. 15A and FIG. 15B, S903 specifically includes:

S903*a*: Detect a human face angle of the preview image and record the human face angle of the preview image in a cache.

n human face angles may be stored in the cache in sequence according to a chronological sequence of preview images.

Figures 16, 17:
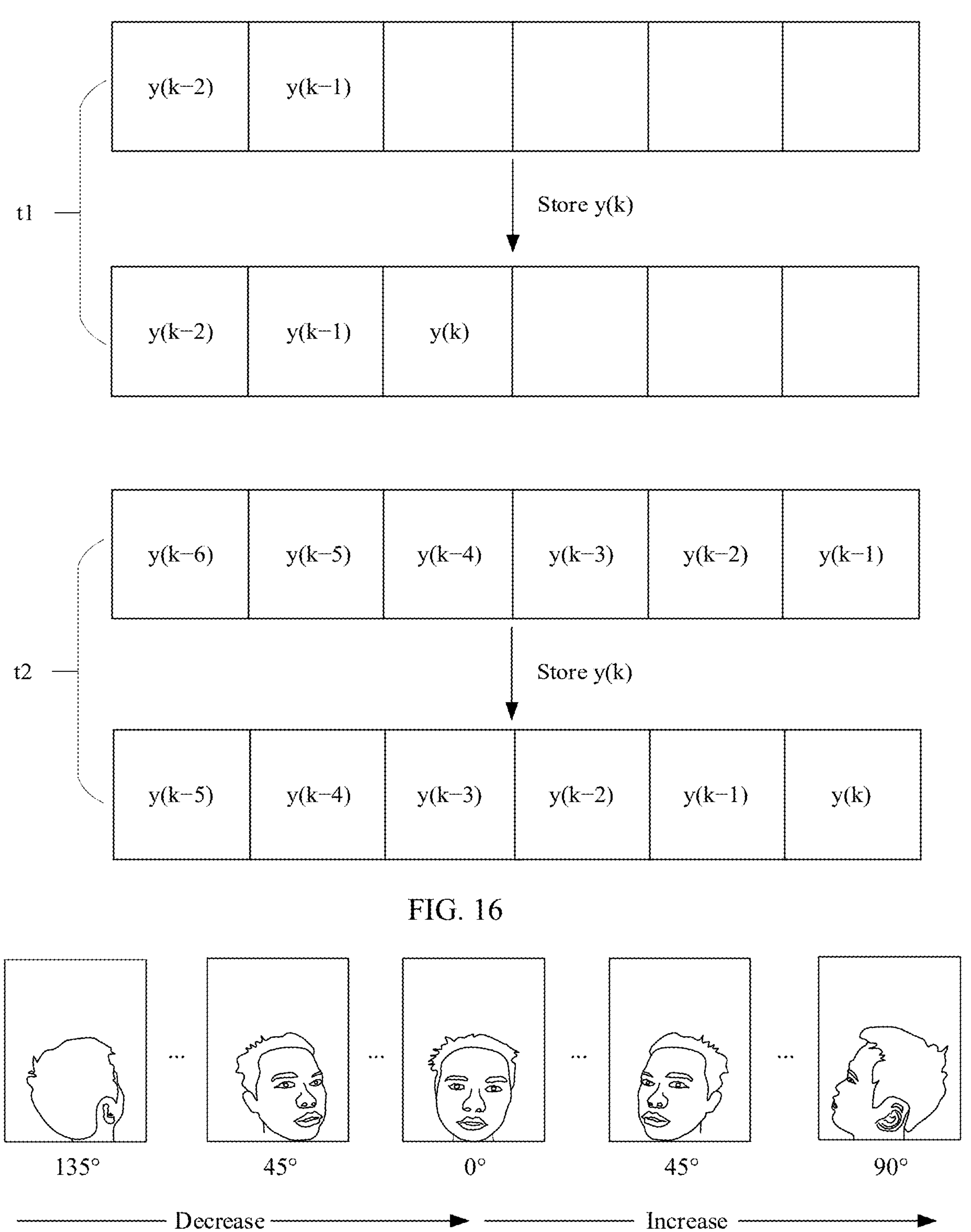
FIG. 16 is a diagram of an image capture principle according to an embodiment of this application.
FIG. 17 is a diagram of a motion other than looking back.

When a quantity of human face angles stored in the cache does not reach n, in S903*a*, the electronic device may directly store a human face angle of a currently captured preview image (namely, the $k^{th}$ frame of preview image) in the cache. For example, n=6. As shown in FIG. 16, at a moment t1, a human face angle y(k) of the $k^{th}$ frame of preview image is detected. In this case, human face angles stored in the cache include y(k−2) and y(k−1), and six human face angles are not totally stored. Therefore, the electronic device may directly store y(k) after y(k−1).

When a quantity of human face angles stored in the cache reaches n, in S903*a*, the electronic device may remove a human face angle of a $(k-n)^{th}$ frame of preview image, move human face angles from a $(k-n+1)^{th}$ frame of preview image to a $(k-1)^{th}$ frame of preview image forward one storage position of a human face angle of a previous frame of preview image sequentially, and finally store the $k^{th}$ frame of preview image after the moved human face angle of the $(k-1)^{th}$ frame of preview image. Still refer to FIG. 16. At a moment t2, a human face angle y(k) of the $k^{th}$ frame of preview image is detected. In this case, six human face angles from y(k−6) to y (k−1) are stored in the cache, that is, the cache already stores the total six human face angles. Therefore, the electronic device may remove y(k−6) from the cache, move y(k−5) to y(k−1) one left position, and finally store y(k) after y(k−1).

Before S904 or S905, there is a need for detecting whether the human face angles from the $i^{th}$ frame of preview image to the $k^{th}$ frame of preview image meet the preset condition. Specifically, refer to S1501 to 1505 shown in FIG. 15A and FIG. 15B.

S1501: Detect whether the quantity of the human face angles in the cache reaches n. If the quantity of the human face angles in the cache reaches n, perform S1502. If the quantity of the human face angles in the cache does not reach n, continue to perform S901 and a subsequent step of S901.

After storing the human face angle of the $k^{th}$ frame of preview image, if the quantity of the human face angles in the cache still does not reach n, that is, the total n human face angles is not stored in the cache, the electronic device continues to perform S901 and a subsequent step of S901.

After storing the human face angle of the $k^{th}$ frame of preview image, if the quantity of the human face angles in the cache reaches n, that the total n human face angles is stored in the cache, the electronic device performs S1502 to further detect the preset condition.

For example, at the moment t2 shown in FIG. 16, after storing the human face angle y(k) of the $k^{th}$ frame of preview image into the cache, if the cache stores the total six human face angles, S1502 may be performed.

Before introduction of S1502, it should be noted that in this specific implementation, when the electronic device detects that the n human face angles stored in the cache satisfy a decreasing change trend, and a $1^{st}$ human face angle in the n human face angles is greater than the first angle threshold, a first tag is recorded (refer to the descriptions of S1503 to S1505 below for details). To be specific, the first tag may indicate that the human face angles decrease from a large value, that is, indicate that a start condition for looking back is met before the $k^{th}$ frame.

Based on this, in this specific implementation, whether the start condition for looking back is already met is determined by performing S1502.

S1502: Detect whether the first tag exists. If the first tag does not exist, perform S1503. If the first tag exists, perform S1505.

If the first tag exists, it indicates that the start condition for looking back is already met. In this case, S1505 is performed, to further detect whether human face angles decrease to a smallest value, and the smallest value is less than the second angle threshold, that is, detect whether an end condition for looking back is met.

If the first tag does not exist, it indicates that the start condition for looking back is not met. In this case, S1503 is performed, to further detect whether the start condition for looking back is met up to the $k^{th}$ frame.

S1503: Detect whether the human face angles in the cache show a decreasing change trend, and whether the $1^{st}$ human face angle is greater than the first angle threshold. If the human face angles in the cache show a decreasing change trend, and the $1^{st}$ human face angle is greater than the first angle threshold, perform S1504. If the human face angles in the cache do not show a decreasing change trend, and the $1^{st}$ human face angle is not greater than the first angle threshold, perform S904*a*.

The $1^{st}$ human face angle is a human face angle first stored in the cache, that is, as shown in FIG. 16, the human face angle y(k−5) of the $(k-n+1)^{th}$ frame of preview image.

For example, the electronic device may calculate a difference φ between an average value of the last n/2 human face angles and an average value of the first n/2 human face angles. If the difference φ is less than 0, it is determined that the human face angles in the cache show a decreasing change trend. In addition, the electronic device compares the $1^{st}$ human face angle in the cache with the first angle threshold, and determines whether the $1^{st}$ human face angle is greater than the first angle threshold.

If it is detected that the human face angles in the cache show a decreasing change trend, and the $1^{st}$ human face angle is greater than the first angle threshold, it indicates that the start condition for looking back is met. In this case, S1504 is performed, to indicate that the start condition for looking back is already met. If it is detected that the human face angles in the cache do not show a decreasing change trend, and/or the $1^{st}$ human face angle is less than or equal to the first angle threshold, it indicates that the start condition for looking back is not met. In this case, S904*a* may be performed, to determine that a highlight frame of looking back is not detected yet.

S1504: Record the first tag.

After the first tag is recorded, for example, in a next round of performing S1502, the existence of the first tag is detected. Subsequently, S1505 and a subsequent step of S1505 are performed to detect whether the end condition for looking back is met.

If it is detected that the human face angles in the cache show a decreasing change trend, and the $1^{st}$ human face angle is greater than the first angle threshold, it is only determined that the start condition for looking back is met, and a highlight frame of looking back is not detected yet. In this case, the electronic device also needs to perform S904*a*. It should be understood that, S904*a* may be performed after S1504 (as shown in FIG. 15A and FIG. 15B), or may be performed before S1504, or may be performed with S1504 at the same time.

S1505: Detect whether the $1^{st}$ human face angle in the cache is less than the second angle threshold and is a smallest angle in the cache.

The electronic device compares the $1^{st}$ human face angle in the cache with the second angle threshold, and determines whether the $1^{st}$ human face angle is less than the second angle threshold. In addition, the electronic device compares the $1^{st}$ human face angle in the cache with another human face angle, to determine whether the $1^{st}$ human face angle is the smallest angle in the cache.

If the $1^{st}$ human face angle in the cache is less than the second angle threshold and is the smallest angle in the cache, it indicates that the end condition for looking back is met. In this case, S905*a* is performed, to store a highlight frame of looking back. If the $1^{st}$ human face angle in the cache is greater than or equal to the second angle threshold, and/or the $1^{st}$ human face angle is the smallest angle in the cache, it indicates that the end condition is not met. In this case, S904*a* may be performed, to determine that a highlight frame of looking back is not detected yet.

Still refer to FIG. 15A and FIG. 15B, S904 further includes:

S904*a*: If the first tag does not exist, or the first tag exists and the $1^{st}$ human face angle in the cache is greater than or equal to the second angle threshold and/or not the smallest angle in the cache, determine that no highlight frames of looking back exist up to the $k^{th}$ frame of preview image.

In addition, after performing S904*a*, the electronic device may continue perform S901 and a subsequent step of S901, to detect a next frame of preview image.

S905 further includes:

S905*a*: If the first tag exists, the $1^{st}$ human face angle in the cache is less than a second angle threshold, and the $1^{st}$ human face angle is the smallest angle in the cache, store a preview image corresponding to the $1^{st}$ human face angle.

The preview image corresponding to the $1^{st}$ human face angle is the $(k-n+1)^{th}$ frame of preview image.

S906*a*: Clear the cache and the first tag.

If no faces exist in the $k^{th}$ frame of preview image, the electronic device does not need to detect a highlight frame of looking back for the $k^{th}$ frame of preview image. In this case, the electronic device needs to clear the cache, that is, deletes the human face angles. In this way, discontinuous human face angles of a human face in preview images are not used for subsequent detection of a highlight frame of looking back. In addition, the electronic device needs to delete the first tag. In this way, whether the start condition for looking back is met needs to be detected again subsequently, and the first tag for preview images without continuous human faces is not used for subsequent detection of a highlight frame of looking back.

In the specific implementation shown in FIG. 15A and FIG. 15B, in a looking back process in which the human face angles decrease from greater than the first angle threshold to less than the second angle threshold, the electronic device may determine a moment of a smallest human face angle as a moment of looking back. For convenience of understanding this effect, the following two groups of sequences of human face angles (unit: °) shown in Table 1 are used for description.

TABLE 1

| | Frame number | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| First group | 70 | 65 | 62 | 60 | 55 | 52 | 48 | 44 | 42 | 43 | 38 | 33 | 30 | 28 | 25 | 27 | 29 | 33 | 34 | 34 |
| Second group | 70 | Null | Null | 40 | 38 | 37 | 34 | 30 | 25 | 22 | 18 | 16 | 12 | 9 | 6 | 2 | 2 | 5 | 7 | 12 |

Null represents no faces.

For example, n=6, the first angle threshold is 65°, and the second angle threshold is 30°. For the first human face angle sequence group and the second human face angle sequence group, the processing procedure shown in FIG. 15A and FIG. 15B is used as follows.

First Group:

When k=1, 2, 3, 4, or 5, When the process proceeds to S1501, it is detected that a quantity of human face angles in the cache does not reaches n.

When k=6, after S903*a* is performed, human face angles stored in the cache are 70°, 65°, 62°, 60°, 55°, and 52°. When the process proceeds to S1501, it is detected that a quantity of the human face angles in the cache reaches n. When S1502 is continuously performed, it is detected that a first tag does not exist. When S1503 is continuously performed, it is detected that the human face angles in the cache show a decreasing change trend, and a $1^{st}$ human face angle (70°) is greater than the first angle threshold. When S1504 is continuously performed, the first tag is recorded. When S904*a* is continuously performed, it is determined that no highlight frames of looking back exist up to a $6^{th}$ frame of preview image.

When k=7, after S903*a* is performed, human face angles stored in the cache are 65°, 62°, 60°, 55°, 52°, and 48°. When the process proceeds to S1501, it is detected that a quantity of the human face angles in the cache reaches n. When S1502 is continuously performed, it is detected that a first tag exists (recorded when k=6). When S1505 is continuously performed, it is detected that a $1^{st}$ human face angle (65°) is greater than the second angle threshold and is not a smallest angle in the cache. When S904*a* is continuously performed, it is determined that no highlight frames of looking back exist up to a $7^{th}$ frame of preview image.

When k=8, 9, 10, . . . , or 18, an execution process is consistent with the execution process when k=7. Details are not described herein again.

When k=19, after S903*a* is performed, human face angles stored in the cache are 28°, 25°, 27°, 29°, 33°, and 34°. When the process proceeds to S1501, it is detected that a quantity of the human face angles in the cache reaches n. When S1502 is continuously performed, it is detected that a first tag exists (recorded when k=6). When S1505 is continuously performed, it is detected that a $1^{st}$ human face angle (28°) is less than the second angle threshold and is not a smallest angle in the cache. When S904*a* is continuously performed, it is determined that no highlight frames of looking back exist up to a 19th frame of preview image.

When k=20, after S903*a* is performed, human face angles stored in the cache are 25°, 27°, 29°, 33°, 34°, and 34°. When the process proceeds to S1501, it is detected that a quantity of the human face angles in the cache reaches n. When S1502 is continuously performed, it is detected that a first tag exists (recorded when k=6). When S1505 is continuously performed, it is detected that a $1^{st}$ human face angle (25°) is less than the second angle threshold and is a smallest angle in the cache, that is, it is determined that the $1^{st}$ human face angle is the smallest angle in a decreasing change. When S905*a* is continuously performed, a $(20-6+1)^{th}$ frame of preview image (namely, 15th frame of preview image) or a $20^{th}$ frame of preview image is stored.

Second Group:

When k=1, after S903*a* is performed, a human face angle stored in the cache is 70°. When the process proceeds to S1501, it is detected that a quantity of human face angles in the cache does not reaches n.

When k=2 or 3, because no faces exist, when the process proceeds to S906*a*, the cache is cleared, for example, the human face angle of 70° is cleared.

When k=4, 5, 6, . . . , or 8, after S903*a* is performed, when the process proceeds to S1501, it is detected that a quantity of human face angles in the cache does not reaches n.

When k=9, after S903*a* is performed, human face angles stored in a cached sequence are 40°, 38°, 37°, 34°, 30°, and 25°. When the process proceeds to S1501, it is detected that a quantity of the human face angles in the cache reaches n. When S1502 is continuously performed, it is detected that a first tag does not exist. When S1503 is continuously performed, it is detected that the human face angles in the cache show a decreasing change trend, and a $1^{st}$ human face angle (40°) is less than the first angle threshold. When S904*a* is continuously performed, it is determined that no highlight frames of looking back exist up to a $9^{th}$ frame of preview image.

When k=10, 11, 12, . . . , or 20, an execution process is consistent with the execution process when k=9. To be specific, a highlight frame of looking back is not determined in both processes.

It can be seen that, during applying the process of FIG. 15A and FIG. 15B to the second human face sequence group, even if human face angles do indeed decrease and then increase, a looking back process is not identified because human face angles do not decrease from a large angle.

In some scenarios, when a head has a motion other than looking back, a case in which human face angles change from large to small and then from small to large may also occur. For example, a human face may scan around surrounding objects, such as moving from the left rear of the body to the right side of the body as shown in FIG. 17, and human face angles may decrease from 135° to 0°, and then increase from 0° to 90°. However, it is clear that the human face movement shown in FIG. 17 is not a looking back process.

Difference with a motion process similar to that shown in FIG. 17 lies in that the human face usually pauses for a period of time at the end moment of looking back. During this period of time, human face angles only have a minimal change, such as a change within 3°.

Based on this, in some embodiments, the preset condition further includes: Absolute differences θ between the human face angle of the $j^{th}$ frame of preview image and human face angles of m (m≥1, and m is an integer) continuous frames of preview images that are after the $j^{th}$ frame of preview image are less than a preset difference 1 (also referred to as a first difference threshold). m may be a small value such as 1, 2, 3, or the like. The preset difference 1 is a value close to 0, such as 1°, 2°, 3°, 5°, 10°, or the like. In this way, a case in which human face angles decrease to a smallest value and change by a large amplitude can be excluded. In this way, a highlight frame of looking back is more accurately determined. For ease of description, any frame of preview image in the m frames of preview images may be referred to as a first preview image.

That absolute differences θ are less than a preset difference 1 includes at least one of the following: The absolute differences θ between the human face angle of the $j^{th}$ frame of preview image and the human face angles of the m frames of preview images are all less than the preset difference 1; a sum of the absolute differences θ between the human face angle of the $j^{th}$ frame of preview image and the human face angles of the m frames of preview images is less than the preset difference 1; an average value of the absolute differences θ between the human face angle of the $j^{th}$ frame of preview image and the human face angles of the m frames of preview images is less than the preset difference 1; and a largest value in the absolute differences θ between the human face angle of the $j^{th}$ frame of preview image and the human face angles of the m frames of preview images is less than the preset difference 1.

Figure 18A:
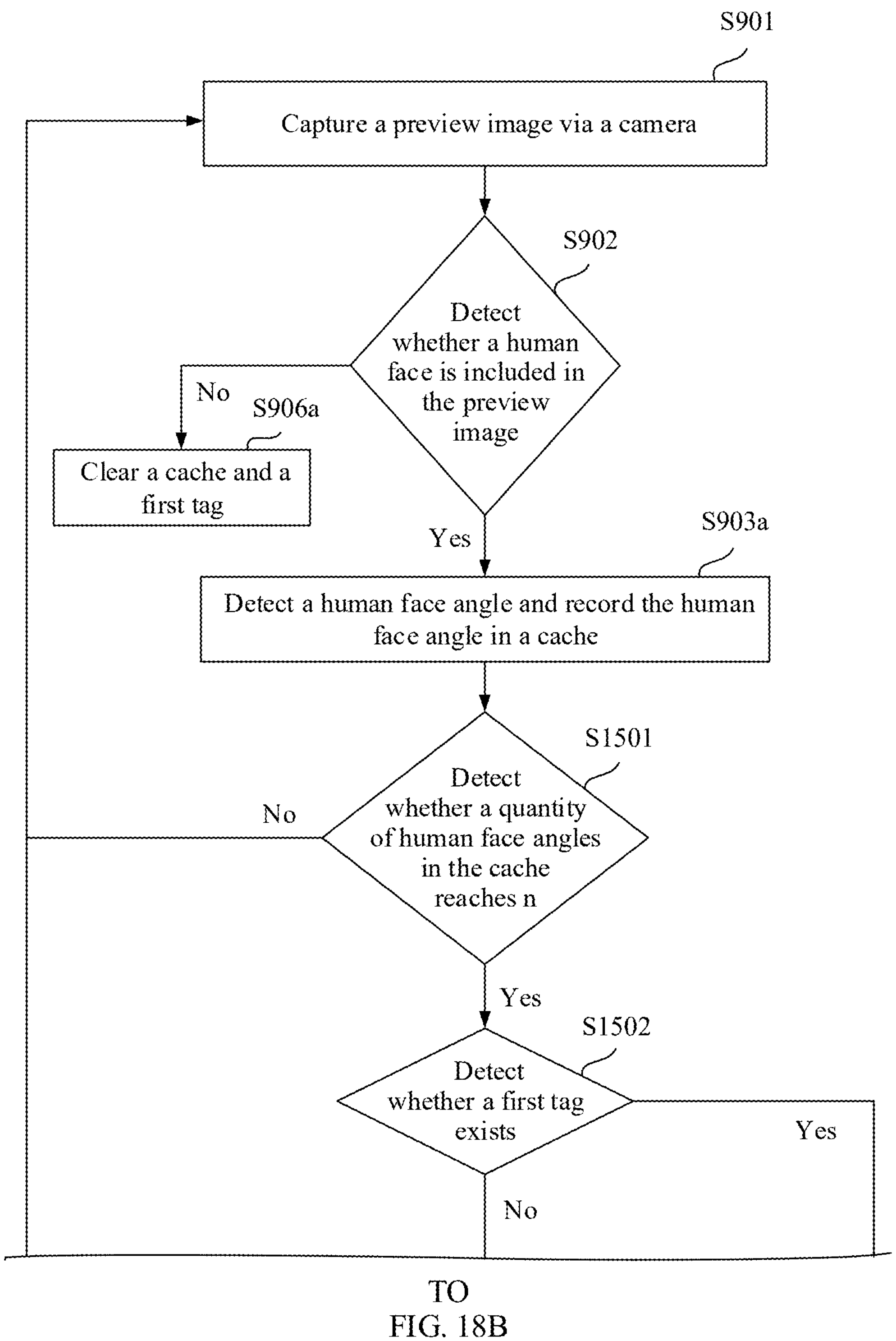
FIG. 18A and FIG. 18B are a schematic flowchart of an image capture method according to an embodiment of this application.
Figure 18B:
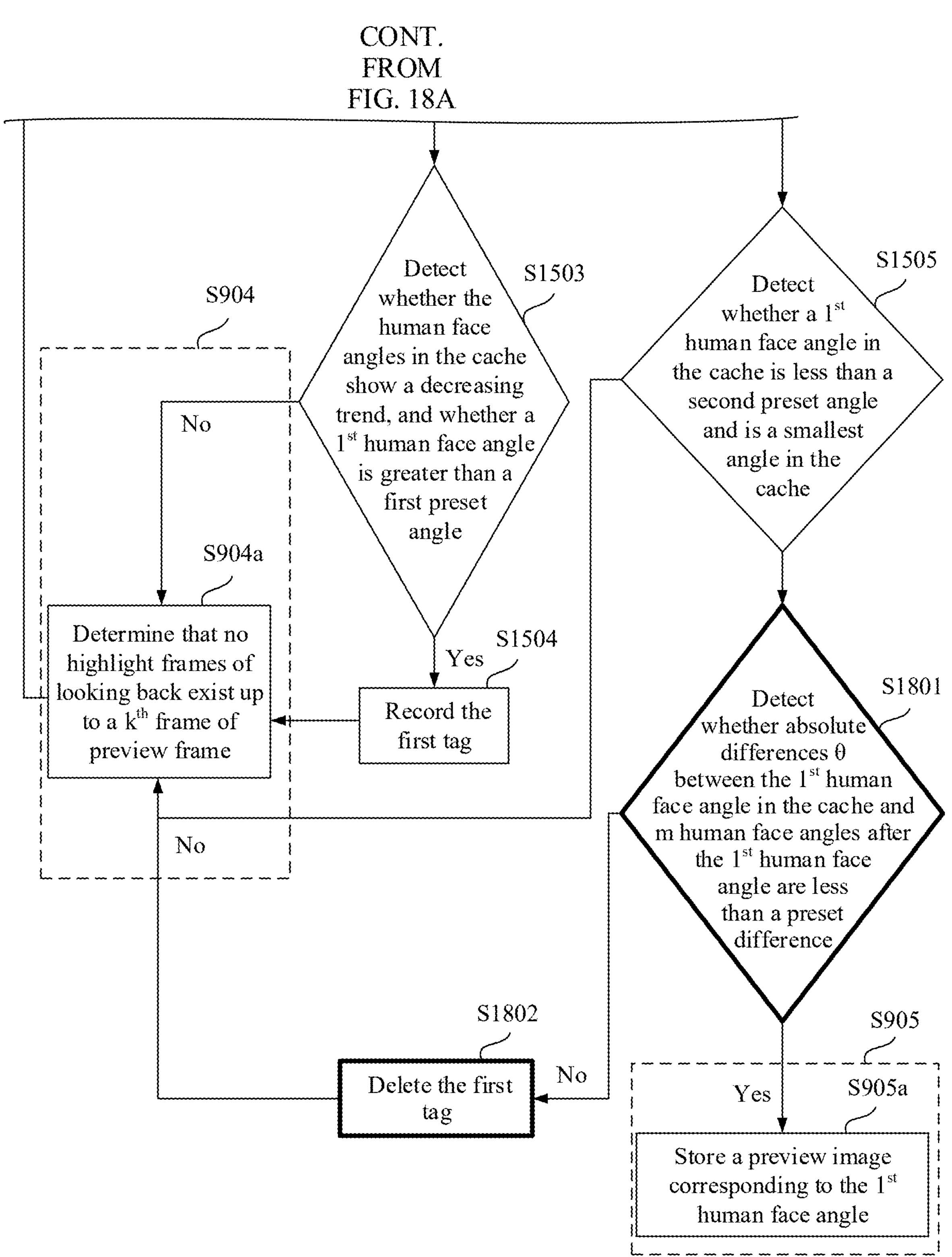

In a specific implementation, as shown in FIG. 18A and FIG. 18B, after S1505, the following is further included.

S1801: Detect whether absolute differences θ between the $1^{st}$ human face angle in the cache and m human face angles after the $1^{st}$ human face angle are less than a preset difference. If the absolute differences θ between the $1^{st}$ human face angle in the cache and the m human face angles after the $1^{st}$ human face angle are less than the preset difference, perform S905*a*. If the absolute differences θ between the $1^{st}$ human face angle in the cache and the m human face angles after the $1^{st}$ human face angle are not less than the preset difference, perform S1802.

The m human face angles and m frames of preset frames are in a one-to-one correspondence. For example, if the m preset frames are a $50^{th}$, $51^{st}$, and $52^{nd}$ frames, the m human face angles are a human face angle y(50) of the $50^{th}$ frame of preview image, a human face angle y(51) of the $51^{st}$ frame of preview image, and a human face angle y(52) of the $52^{nd}$ frame of preview image.

In an example of the first human face angle sequence group in Table 1, when m=2, the preset difference 1 is 5°, and k=20, the human face angles stored in the cache are 25°, 27°, 29°, 33°, 34°, and 34°). A detected result in performing S1505 is that a $1^{st}$ human face angle (25° in the cache is less than the second angle threshold and is a smallest angle in the cache. S1801 is continuously performed, and it is detected that absolute differences θ between the $1^{st}$ human face angle (25°) in the cache and two human face angles (27° and 29°) after the $1^{st}$ human face angle are 2 and 4, respectively, and are both less than the preset difference 1 (5°). In other words, the absolute differences θ between the $1^{st}$ human face angle in the cache and the m human face angles after the $1^{st}$ human face angle are less than the preset difference.

If the absolute differences θ between the $1^{st}$ human face angle in the cache and the m human face angles after the $1^{st}$ human face angle are less than the preset difference 1, it indicates that the human face angles change only by a small amplitude after decreasing to the smallest value. In this case, the electronic device performs S905*a*, to store a highlight frame of looking back.

If the absolute differences θ between the $1^{st}$ human face angle in the cache and the m human face angles after the $1^{st}$ human face angle are greater than or equal to the preset difference 1, it indicates that the human face angles change by a large amplitude after decreasing to the smallest value. In this case, the electronic device determines that the process is not a looking back process, and performs S1802, for subsequently detecting again a start condition for looking back.

S1802: Delete the first tag, and continue to perform S901.

After the first tag is deleted, in a next round of performing S1502, the electronic device may detect that the first tag does not exist, and then performs S1503, to detect again whether the start condition for looking back is met.

In the specific implementation shown in FIG. 18A and FIG. 18B, based on FIG. 15A and FIG. 15B, a moment at which the human face angles reach the smallest value is determined as the end moment of looking back only when it is determined that there is a small amplitude of change after the human face angles decrease to the smallest value. This improves accuracy of the determined highlight frame.

In some scenarios, there may be a deviation when the electronic device detects a human face angle. Experience shows that a typical deviation situation is that a side face with a large angle is likely to encounter a deviation. For example, 90° is detected as 25°, 30°, or the like. In this scenario, the detected human face angle may have a jump, such as a large increase or decrease. For example, comparison between real values for a change of human face angles and human face angles (referred to as detected values) detected by the electronic device is shown in Table 2:

TABLE 2

| | Frame number | | | | | | | |
|---|---|---|---|---|---|---|---|---|
| | 1 | 2 | 3 | 4 | 5 | 6 | 7 | 8 |
| Real value | 91 | 90 | 90 | 89 | 85 | 82 | 80 | 78 |
| Detected value | 91 | 90 | 30 | 31 | 85 | 82 | 82 | 78 |

Table 2 above reflects that the electronic device detects a human face angle of 90° in a $3^{rd}$ frame of preview image as 30°, and detects a human face angle of 89° in a $4^{th}$ frame of preview image as 31°. In this case, from the detection results, the human face angle jumps from 90° in a $2^{nd}$ frame of preview image to 30° in the $3^{rd}$ frame of preview image, and the human face angle jumps from 31° in the $4^{th}$ frame of preview image to 85° in a $5^{th}$ frame of preview image.

However, in reality, the change in human face angle is a stable process and usually does not experience a jump.

Based on this, in some embodiments, the preset condition further includes: Absolute differences λ between the human face angle of the $j^{th}$ frame of preview image and human face angles in adjacent preview images before and after the $j^{th}$ frame of preview image are both less than a preset difference 2 (also referred to as a second difference threshold). The preset difference 2 is a large value, such as 45°, 50°, 60°, or the like. In this way, a case in which human face angles decrease to a smallest value but a jump occurs at the smallest value can be excluded. In this way, a highlight frame of looking back is more accurately determined. For ease of description, any frame of preview image in the adjacent preview images before and after the $j^{th}$ frame of preview image may be referred to as a second preview image. To be specific, the second preview image is a $(j-1)^{th}$ frame of preview image or a $(j+1)^{th}$ frame of preview image.

Figure 19A:
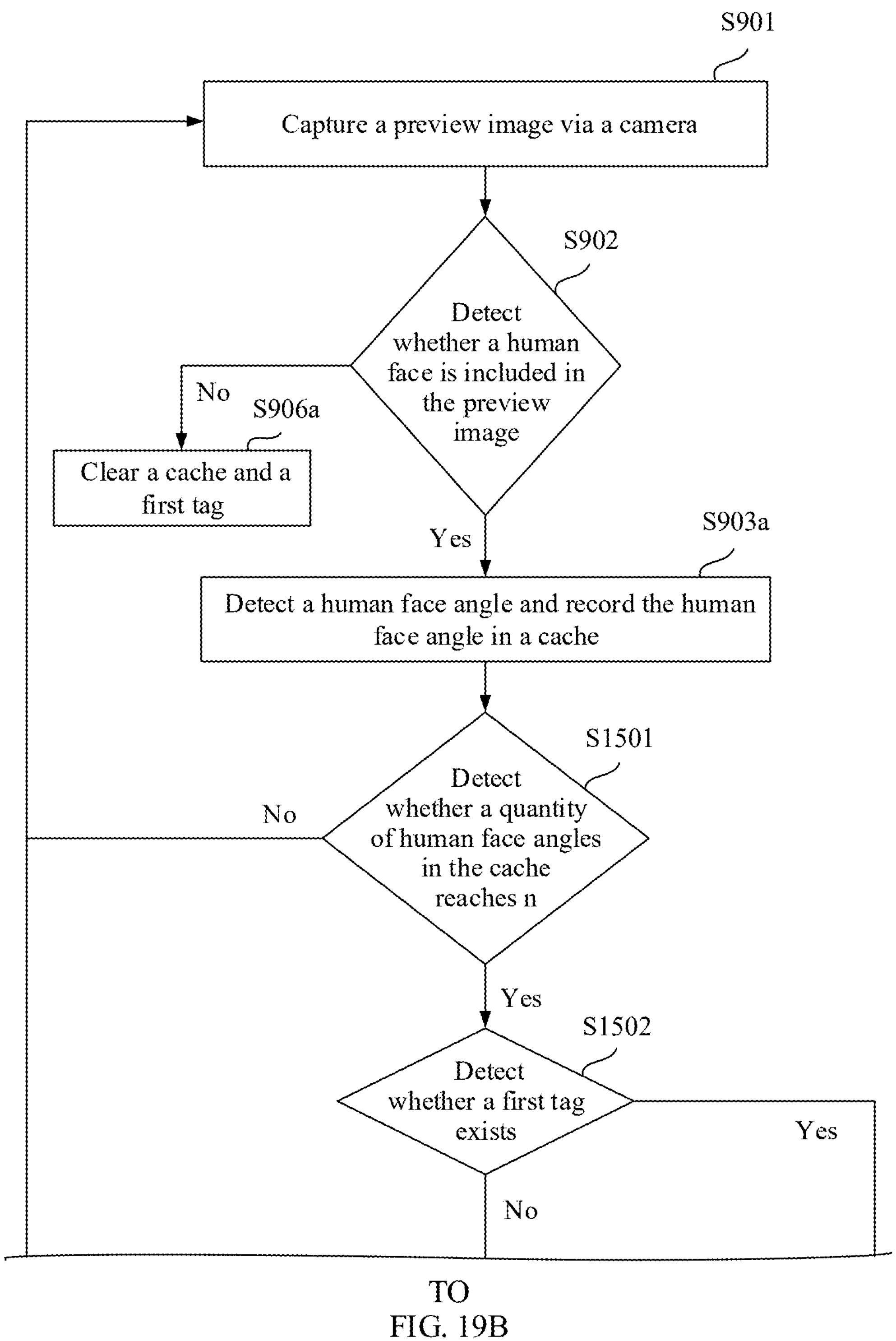
FIG. 19A and FIG. 19B are a schematic flowchart of an image capture method according to an embodiment of this application.
Figure 19B:
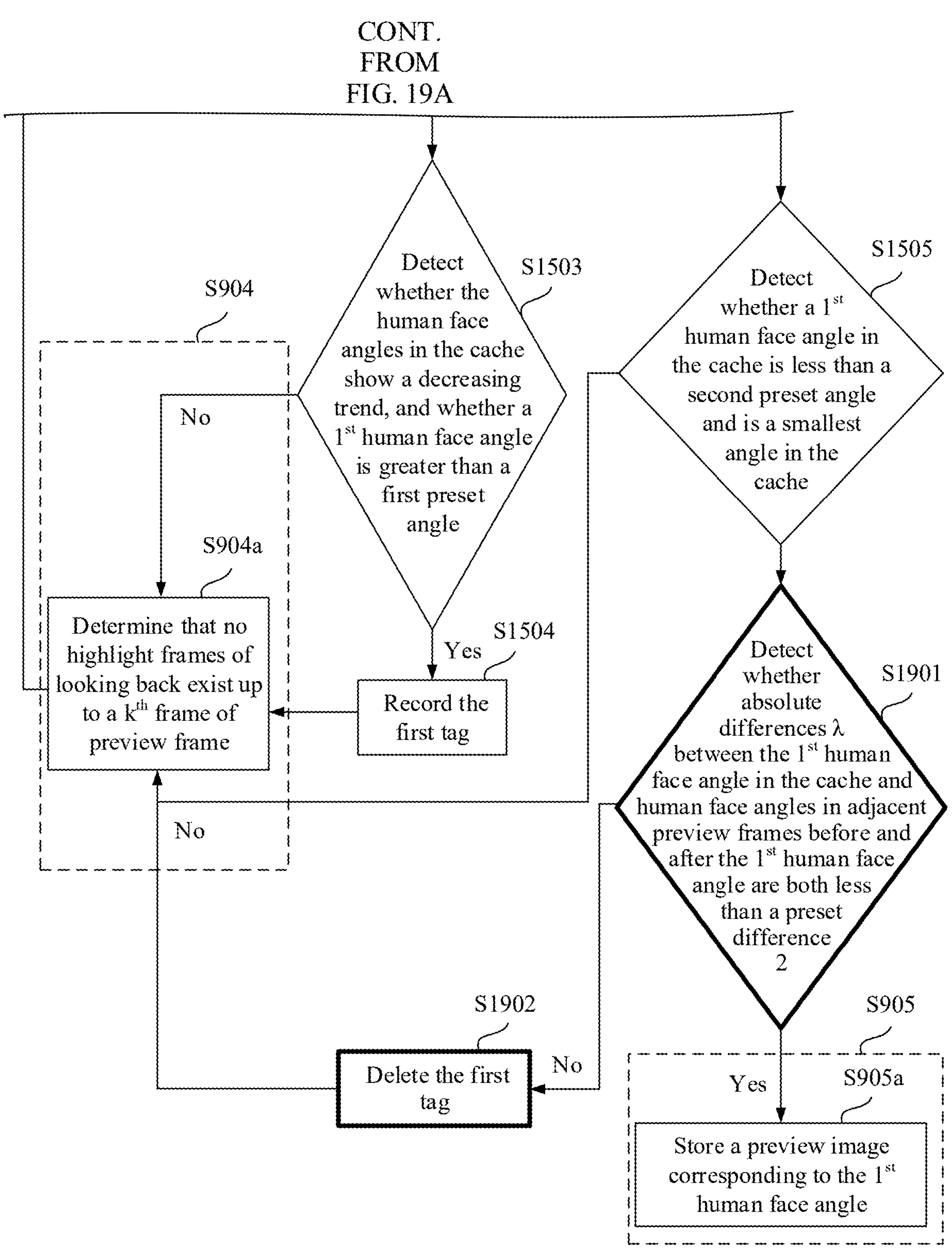

In a specific implementation, as shown in FIG. 19A and FIG. 19B, after S1505, the following is further included.

S1901: Detect whether absolute differences λ between the $1^{st}$ human face angle in the cache and human face angles in adjacent preview images before and after the $1^{st}$ human face angle are both less than a preset difference 2. If the absolute differences λ between the $1^{st}$ human face angle in the cache and the human face angles in the adjacent preview images before and after the $1^{st}$ human face angle are both less than the preset difference 2, perform S905*a*. If the absolute differences λ between the $1^{st}$ human face angle in the cache and the human face angles in the adjacent preview images before and after the $1^{st}$ human face angle are not both less than the preset difference 2, perform S1902.

A $2^{nd}$ human face angle in the cache is a human face angle in an adjacent preview image after the $1^{st}$ human face angle.

In addition, in latest performing of S903*a*, a human face angle removed from the cache is a human face angle in an adjacent preview image before the $1^{st}$ human face angle. To facilitate obtaining the human face angle in the adjacent preview image before the $1^{st}$ human face angle in the cache in S1901, when performing S903*a*, the electronic device may temporarily store the human face angle removed from the cache until the processing for the $k^{th}$ frame is completed, for example, S904*a* or S905*a* is completed, the temporarily stored human face angle is deleted.

For example, the temporarily stored human face angle is the human face angle (90°) in the $2^{nd}$ frame of preview image shown in Table 2, and the human face angles in the cache are the human face angles from the $3^{rd}$ frame of preview image to an $8^{th}$ frame of preview image shown in Table 2, that is, the stored human face angles are sequentially 30°, 31°, 85°, 82°, 82°, and 78°, a detected result in performing S1505 is that the $1^{st}$ human face angle (30°) in the cache is less than the second angle threshold (such as 35°) and is a smallest angle in the cache. When S1901 is continuously performed, it is detected that an absolute difference between the $1^{st}$ human face angle (30°) and the $2^{nd}$ human face angle in the cache is 1, and is less than the preset difference 2 (such as 50°); and it is detected that an absolute difference between the $1^{st}$ human face angle (30°) in the cache and the temporarily stored human face angle (90° is 60°), and is greater than the preset difference 2 (such as 50°). In other words, the absolute differences λ between the $1^{st}$ human face angle in the cache and the human face angles in the adjacent preview images before and after the $1^{st}$ human face angle are not both less than the preset difference 2.

If the absolute differences λ between the $1^{st}$ human face angle in the cache and the human face angles in the adjacent preview images before and after the $1^{st}$ human face angle are both less than the preset difference 2, it indicates that the human face angles decrease to a smallest value which is not a value obtained through a jump. In this case, the electronic device performs S905*a*, to store a highlight frame of looking back.

If the absolute differences λ between the $1^{st}$ human face angle in the cache and the human face angles in the adjacent preview images before and after the $1^{st}$ human face angle are not both less than the preset difference 2, it indicates that the human face angles decrease to a smallest value which is a value obtained through a jump. In this case, the electronic device determines that the process is not a looking back process, and performs S1902, for subsequently detecting again a start condition for looking back.

S1902: Delete the first tag, and continue to perform S901.

After the first tag is deleted, in a next round of performing S1502, the electronic device may detect that the first tag does not exist, and then performs S1503, to detect again whether the start condition for looking back is met.

In the specific implementation shown in FIG. 19A and FIG. 19B, based on FIG. 15A and FIG. 15B, a moment at which the human face angles reach the smallest value is determined as the moment of looking back only when the smallest value to which the human face angles decrease is not a value obtained through a jump. This improves accuracy of the determined highlight frame.

Certainly, the embodiment in which the case in which the human face angles decrease to the smallest value and change by a large amplitude is excluded and the embodiment in which the case in which the human face angles decrease to the smallest value but a jump occurs at the smallest value is excluded can be used in combination. For example, FIG. 18A and FIG. 18B and FIG. 19A and FIG. 19B can be used in combination.

Herein, it should be noted that the specific process of AI capture mentioned above describes the capture process of only one highlight frame of looking back. In actual implementation, after starting AI capture, a photographed person may look back a plurality of times, and correspondingly, there may be a plurality of highlight frames of looking back.

Based on this, in some embodiments, the electronic device may continue detection after detecting one highlight frame of looking back. For example, after storing the $j^{th}$ frame of preview image or the $k^{th}$ frame of preview image in S905 shown in FIG. 9, the electronic device may continue to perform S901 and a subsequent step of S901. For another example, after storing the $j^{th}$ frame of preview image or the $k^{th}$ frame of preview image in S905*a* shown in FIG. 16 or FIG. 17, the electronic device may continue to perform S901 and a subsequent step of S901 after deleting the first tag.

In addition, a preview image may include a plurality of human faces. In embodiments of the application, highlight frames of looking back for each face may be detected separately. For example, for each face, human face angles are stored separately and detected. For example, human face angles are stored in different caches.

Phase 3: End the AI capture.

In the AI capture process, the electronic device can end the capture in response to an end event.

Figure 20A:
FIG. 20A and FIG. 20B are a diagram of an interface of a mobile phone according to an embodiment of this application.
Figure 20B:
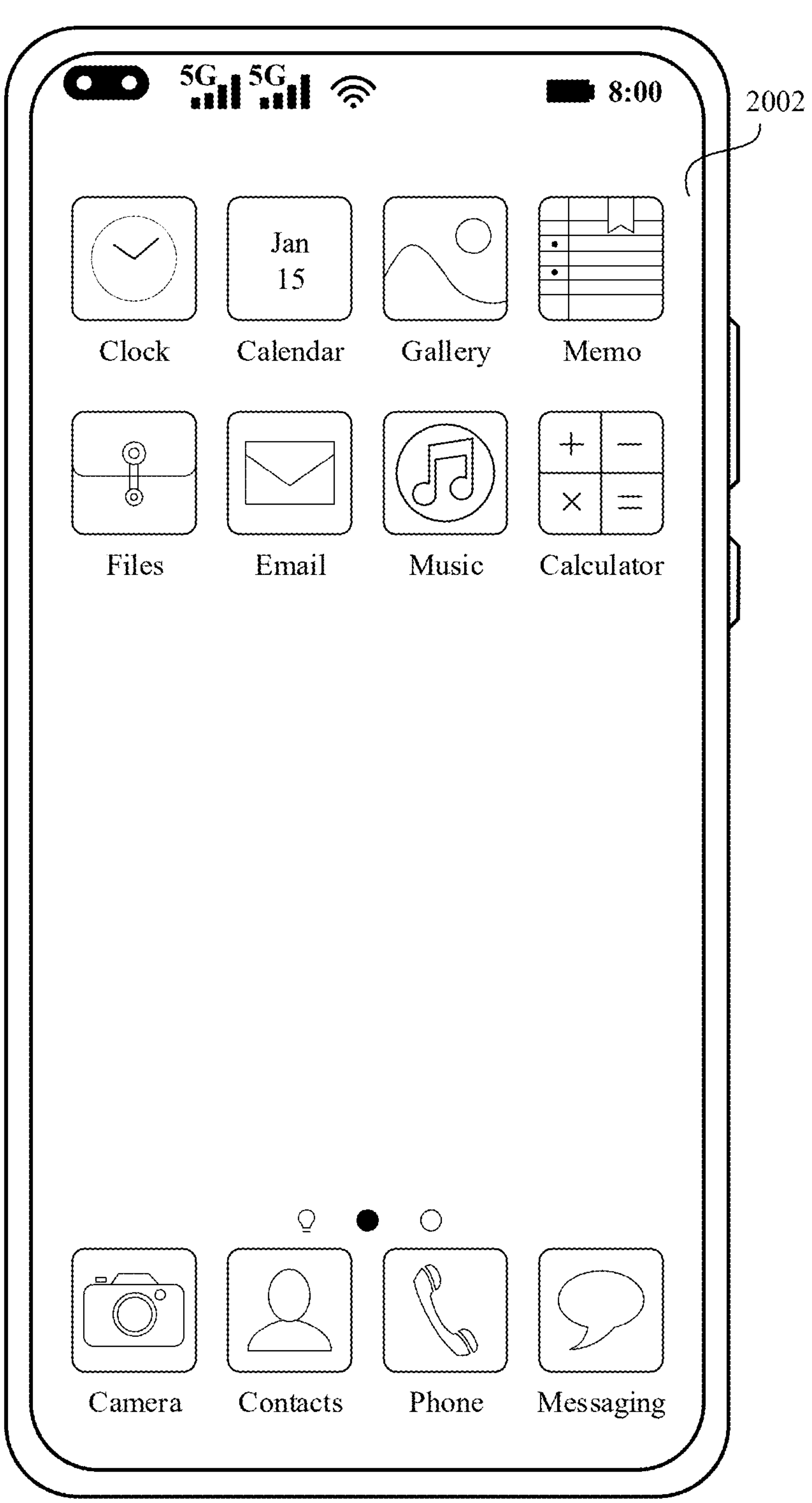

In some embodiments, the end event is an event of exiting a preset interface during the capture process. The preset interface is the framing interface for scene previewing or scene recording. For example, during the AI capture process, in response to a swipe up operation of the user on a framing interface 2001 shown in FIG. 20A and FIG. 20B, the mobile phone may display a home screen 2002 shown in FIG. 20A and FIG. 20B. In this case, the preset interface is exited, and the AI capture ends.

In some other embodiments, the end of capture event may be an event of receiving an operation of disabling the AI capture function by the user during the AI capture process.

An embodiment of this application further provides an electronic device. The electronic device may include a memory and one or more processors. The memory is coupled to the processor. The memory is configured to store computer program code. The computer program code includes computer instructions. When the processor executes the computer instructions, the electronic device may perform functions or steps in the foregoing method embodiments.

Figure 21:
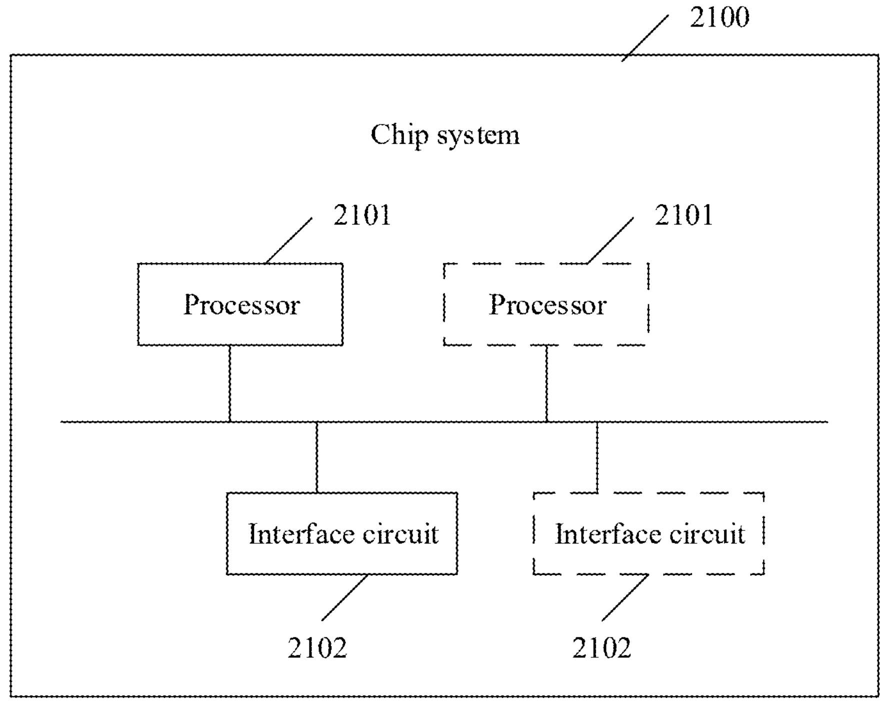
FIG. 21 is a diagram of a structure of a chip system according to an embodiment of this application.

An embodiment of this application further provides a chip system. As shown in FIG. 21, the chip system 2100 includes at least one processor 2101 and at least one interface circuit 2102. The processor 2101 and the interface circuit 2102 may be interconnected through a line. For example, the interface circuit 2102 may be configured to receive a signal from another apparatus (for example, a memory of an electronic device). For another example, the interface circuit 2102 may be configured to send a signal to another apparatus (for example, the processor 2101). For example, the interface circuit 2102 may read instructions stored in the memory, and send the instructions to the processor 2101. When the instructions are executed by the processor 2101, the electronic device is enabled to perform the steps in the foregoing embodiments. Certainly, the chip system may further include another discrete device. This is not specifically limited in embodiments of this application.

An embodiment further provides a computer-readable storage medium. The computer-readable storage medium stores computer instructions. When the computer instructions are run on an electronic device, the electronic device is enabled to perform the functions or steps in the foregoing method embodiments.

An embodiment of this application further provides a computer program product. When the computer program product runs on a computer, the computer is enabled to perform the functions or steps in the foregoing method embodiments.

In addition, an embodiment of this application further provides an apparatus. The apparatus may specifically be a chip, a component, or a module. The apparatus may include a processor and a memory that are connected. The memory is configured to store computer-executable instructions, and when the apparatus runs, the processor may execute the computer-executable instructions stored in memory, so that the chip performs the functions or steps in the foregoing method embodiments.

The electronic device, communication system, computer-readable storage medium, computer program product, or chip provided in embodiments are all used to execute the corresponding methods mentioned above. Therefore, for beneficial effects that can be achieved, refer to the beneficial effects in the corresponding methods mentioned above. Details are not described herein again.

Persons skilled in the art may clearly learn from the foregoing descriptions of the implementations that, for convenience and brevity of description, division into the foregoing functional modules is only used as an example for description. During actual application, the foregoing functions may be allocated to different functional modules for implementation based on a requirement, that is, an inner structure of an apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be one physical unit or a plurality of physical units, may be located in one position, or may be distributed on a plurality of locations. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may make modifications or equivalent replacements to the technical solutions of this application, without departing from the spirit and scope of the technical solutions of this application.

The invention claimed is:

1. A method, comprising:

capturing a preview image via a camera of an electronic device;

obtaining a human face yaw angle of each frame of the preview image, wherein the human face yaw angle is a left/right rotation angle of an orientation of a face of a first user relative to a first connection line, wherein the first user is photographed by the camera, and wherein the first connection line is a line connecting the camera and a head of the first user; and storing a $j^{th}$ frame of preview image if human face yaw angles from an $i^{th}$ frame of the preview image to a $k^{th}$ frame of the preview image meet a preset condition, wherein the $k^{th}$ frame of the preview image is a frame of the preview image currently captured by the camera, $1 \le i \le j \le k$, and i, j, and k are all integers, wherein the preset condition comprises the human face yaw angle of the $i^{th}$ frame of the preview image is greater than a first angle threshold, human face yaw angles from the $i^{th}$ frame of the preview image to the $j^{th}$ frame of the preview image show a decreasing change trend, and the human face yaw angle of the $j^{th}$ frame of the preview image is less than a second angle threshold.

2. The method of claim 1, wherein $j<k$, and the preset condition further comprises the human face yaw angle of the $j^{th}$ frame of the preview image is a smallest value in human face yaw angles from the $j^{th}$ frame of the preview image to the $k^{th}$ frame of the preview image.

3. The method of claim 2, wherein the preset condition further comprises absolute differences between the human face yaw angle of the $j^{th}$ frame of the preview image and human face yaw angles of m frames of the preview image that are after the $j^{th}$ frame of the preview image are all less than a first difference threshold, wherein $1 \le m$, $(j+m) \le k$, and m is an integer.

4. The method of claim 2, wherein the preset condition further comprises both a) an absolute difference between the human face yaw angle of the $j^{th}$ frame of the preview image and a human face yaw angle of a $(j-1)^{th}$ frame of the preview image and b) an absolute difference between the human face yaw angle of the $j^{th}$ frame of the preview image and a human face yaw angle of a $(j+1)^{th}$ frame of the preview image are less than a second difference threshold.

5. The method of claim 1, wherein after the human face yaw angle of the $k^{th}$ frame of the preview image is obtained, the method further comprises:

storing the human face yaw angle of the $k^{th}$ frame of the preview image in a preset storage space if a quantity of human face yaw angles in the preset storage space is less than n, wherein $2 \le n$, and n is an integer; or removing a human face yaw angle of a $(k-n)^{th}$ frame of the preview image from the preset storage space and storing the human face yaw angle of the $k^{th}$ frame of the preview image in the preset storage space if the quantity of human face yaw angles in the preset storage space is greater than or equal to n.

6. The method of claim 5, wherein after storing the human face yaw angle of the $k^{th}$ frame of the preview image in the preset storage space, the method further comprises:

detecting, if the quantity of human face yaw angles in the preset storage space is greater than or equal to n, and a first tag does not exist in the electronic device, whether a human face yaw angle of a $(k-n+1)^{th}$ frame of the preview image in the preset storage space is greater than the first angle threshold, and detecting a change trend of human face yaw angles from the $(k-n+1)^{th}$ frame of the preview image to the $k^{th}$ frame of the preview image in the preset storage space; and recording the first tag if the human face yaw angle of the $(k-n+1)^{th}$ frame of the preview image is greater than the first angle threshold, and the human face yaw angles from the $(k-n+1)^{th}$ frame of the preview image to the $k^{th}$ frame of the preview image show in a decreasing change trend.

7. The method of claim 6, wherein after storing the human face yaw angle of the $k^{th}$ frame of the preview image in the preset storage space, if the quantity of human face yaw angles in the preset storage space is greater than or equal to n, and a first tag exists in the electronic device, then the human face yaw angle of the $i^{th}$ frame of the preview image is greater than the first angle threshold, and the human face yaw angles of the first user from the $i^{th}$ frame of the preview image to the $j^{th}$ frame of the preview image show in a decreasing change trend.

8. The method of claim 7, wherein the human face yaw angle of the $j^{th}$ frame of the preview image is the human face yaw angle of the $(k-n+1)^{th}$ frame of the preview image in the preset storage space.

9. The method of claim 7, further comprising deleting the first tag if an absolute difference between the human face yaw angle of the $(k-n+1)^{th}$ frame of the preview image in the preset storage space and a human face yaw angle of a first preview image in the preset storage space is greater than a first difference threshold, wherein the first preview image is any preview image from a $(k-n+2)^{th}$ frame of the preview image to a $(k-n+m+1)^{th}$ frame of the preview image.

10. The method of claim 7, further comprising deleting the first tag if an absolute difference between the human face yaw angle of the $(k-n+1)^{th}$ frame of the preview image in the preset storage space and a human face yaw angle of a second preview image is greater than a second difference threshold, wherein the second preview image is the $(k-n)^{th}$ frame of the preview image or the $(k-n+2)^{th}$ frame of the preview image.

11. The method of claim 5, further comprising deleting the human face yaw angle in the preset storage space if the $k^{th}$ frame of the preview image does not comprise the face of the first user.

12. The method of claim 1, wherein before storing the $j^{th}$ frame of the preview image, the method further comprises:

displaying the $j^{th}$ frame of the preview image or a thumbnail of the $j^{th}$ frame of the preview image; and receiving a first operation confirming to store the $j^{th}$ frame of the preview image, wherein the $j^{th}$ frame of the preview image is stored in response to the first operation.

13. The method of claim 1, wherein there are a plurality of first users, and the human face yaw angle comprises human face yaw angles of all the first users.

14. An electronic device, comprising:

a display;

a camera;

one or more processors coupled to the camera and the display; and a memory coupled to the one or more processors and configured to store instructions that, when executed by the one or more processors, cause the electronic device to be configured to:

capture a preview image via the camera;

obtain a human face yaw angle of each frame of the preview image, wherein the human face yaw angle is a left/right rotation angle of an orientation of a face of a first user relative to a first connection line, wherein the first user is photographed by the camera, and wherein the first connection line is a line connecting the camera and a head of the first user; and store a $j^{th}$ frame of preview image if human face yaw angles from an $i^{th}$ frame of the preview image to a $k^{th}$ frame of the preview image meet a preset condition, wherein the $k^{th}$ frame of the preview image is a frame of the preview image currently captured by the camera, $1 \le i \le j \le k$, and i, j, and k are all integers, wherein the preset condition comprises the human face yaw angle of the $i^{th}$ frame of the preview image is greater than a first angle threshold, human face yaw angles from the $i^{th}$ frame of the preview image to the $j^{th}$ frame of the preview image show a decreasing change trend, and the human face yaw angle of the $j^{th}$ frame of the preview image is less than a second angle threshold.

15. A non-transitory computer-readable storage medium, comprising instructions that, when executed by one or more processors of an electronic device, cause the electronic device to be configured to:

capture a preview image via a camera of an electronic device;

obtain a human face yaw angle of each frame of the preview image, wherein the human face yaw angle is a left/right rotation angle of an orientation of a face of a first user relative to a first connection line, wherein the first user is photographed by the camera, and wherein the first connection line is a line connecting the camera and a head of the first user; and store a $j^{th}$ frame of preview image if human face yaw angles from an $i^{th}$ frame of the preview image to a $k^{th}$ frame of the preview image meet a preset condition, wherein the $k^{th}$ frame of the preview image is a frame of the preview image currently captured by the camera, $1 \leq i \leq j \leq k$, and i, j, and k are all integers, wherein the preset condition comprises the human face yaw angle of the $i^{th}$ frame of the preview image is greater than a first angle threshold, human face yaw angles from the $i^{th}$ frame of the preview image to the $j^{th}$ frame of the preview image show a decreasing change trend, and the human face yaw angle of the $j^{th}$ frame of the preview image is less than a second angle threshold.

16. A chip system, wherein the chip system is used in an electronic device comprising a processor and a memory, the chip system comprises one or more interface circuits and one or more processors, the interface circuit is interconnected to the processor through a line, the interface circuit is configured to receive a signal from the memory of the electronic device and send the signal to the processor, the signal comprises computer instructions stored in the memory, and when the processor executes the computer instructions, the electronic device is configured to perform the method of claim 1.

17. The electronic device of claim 14, wherein $j<k$, and the preset condition further comprises the human face yaw angle of the $j^{th}$ frame of the preview image is a smallest value in human face yaw angles from the $j^{th}$ frame of the preview image to the $k^{th}$ frame of the preview image.

18. The electronic device of claim 17, wherein the preset condition further comprises absolute differences between the human face yaw angle of the $j^{th}$ frame of the preview image and human face yaw angles of m frames of the preview image that are after the $j^{th}$ frame of the preview image are all less than a first difference threshold, wherein $1 \leq m$, $(j+m) \leq k$, and m is an integer.

19. The electronic device of claim 17, wherein the preset condition further comprises both a) an absolute difference between the human face yaw angle of the $j^{th}$ frame of the preview image and a human face yaw angle of a $(j-1)^{th}$ frame of the preview image and b) an absolute difference between the human face yaw angle of the $j^{th}$ frame of the preview image and a human face yaw angle of a $(j+1)^{th}$ frame of the preview image are less than a second difference threshold.

20. The electronic device of claim 14, wherein after the human face yaw angle of the $k^{th}$ frame of the preview image is obtained, the electronic device is further configured to:

store the human face yaw angle of the $k^{th}$ frame of the preview image in a preset storage space if a quantity of human face yaw angles in the preset storage space is less than n, wherein $2 \leq n$, and n is an integer; or remove a human face yaw angle of a $(k-n)^{th}$ frame of the preview image from the preset storage space and store the human face yaw angle of the $k^{th}$ frame of the preview image in the preset storage space if the quantity of human face yaw angles in the preset storage space is greater than or equal to n.

* * * * *